US010755214B2

(12) United States Patent
Apap et al.

(10) Patent No.: US 10,755,214 B2
(45) Date of Patent: Aug. 25, 2020

(54) ROBUST FEEDSTOCK SELECTION SYSTEM FOR THE CHEMICAL PROCESS INDUSTRIES UNDER MARKET AND OPERATIONAL UNCERTAINTY

(71) Applicant: Aspen Technology, Inc., Bedford, MA (US)

(72) Inventors: Robert M. Apap, Pittsburgh, PA (US); Dimitrios Varvarezos, Houston, TX (US)

(73) Assignee: Aspen Technology, Inc., Bedford, MA (US)

( * ) Notice: Subject to any disclaimer, the term of this patent is extended or adjusted under 35 U.S.C. 154(b) by 1080 days.

(21) Appl. No.: 15/133,701

(22) Filed: Apr. 20, 2016

(65) Prior Publication Data

US 2017/0308831 A1    Oct. 26, 2017

(51) Int. Cl.
*G06Q 10/06* (2012.01)
*G06Q 50/04* (2012.01)
(Continued)

(52) U.S. Cl.
CPC ....... *G06Q 10/06313* (2013.01); *G06F 17/11* (2013.01); *G06F 17/18* (2013.01);
(Continued)

(58) Field of Classification Search
None
See application file for complete search history.

(56) References Cited

U.S. PATENT DOCUMENTS

| 2003/0139993 | A1* | 7/2003 | Feuerverger | G06Q 40/06 |
| | | | | 705/36 R |
| 2005/0050009 | A1* | 3/2005 | Gardner | G06Q 10/04 |

(Continued)

FOREIGN PATENT DOCUMENTS

WO    WO 02/21401 A2    3/2002

OTHER PUBLICATIONS

Calfa, B.A., et al. "Data-driven individual and joint change-constrained optimization via kernel smoothing"; Computers & Chemical Engineering, 78: 51-69 (2015).
(Continued)

*Primary Examiner* — Alan S Miller
*Assistant Examiner* — Arif Ullah
(74) *Attorney, Agent, or Firm* — Hamilton, Brook, Smith & Reynolds, P.C.

(57) ABSTRACT

A computer system and method optimize feedstock selection planning for an industrial process by evaluating first and second stages at separate intervals throughout the planning process. Evaluating the first stage determines a set of robust feedstocks to procure on long-term contracts. The computer system and method solve, in parallel, multiple simulation cases of a non-linear model generated with different expectation values for uncertain input parameters related to selecting feedstocks to procure on long-term contracts. Probabilistic analyses on the solutions from the simulation cases, including the application of chance-constraints, determine the set of robust feedstocks to procure on long-term contracts. Evaluating the second stage determines a set of robust feedstocks to procure in the spot market, using the information from the first stage. Specifically, the computer system and method solve each of multiple new simulation cases of the non-linear model, generated with different expectation values for uncertain input parameters related to selecting (Continued)

feedstocks to procure in the spot market. Each simulation case is solved to determine breakeven prices for one or more available spot feedstocks, and probabilistic analyses are performed on the breakeven prices for these spot feedstocks to determine a set of robust feedstocks to procure in the spot market.

19 Claims, 16 Drawing Sheets

(51) Int. Cl.
      *G06F 17/11*      (2006.01)
      *G06F 17/18*      (2006.01)
      *G06N 7/00*       (2006.01)
      *G06Q 10/04*      (2012.01)
      *G06Q 30/02*      (2012.01)
      *G06Q 50/06*      (2012.01)

(52) U.S. Cl.
    CPC ............ *G06N 7/005* (2013.01); *G06Q 10/04* (2013.01); *G06Q 10/06375* (2013.01); *G06Q 30/0202* (2013.01); *G06Q 30/0206* (2013.01); *G06Q 50/04* (2013.01); *G06Q 50/06* (2013.01); *Y02P 90/30* (2015.11)

(56) References Cited

U.S. PATENT DOCUMENTS

| | | | | |
|---|---|---|---|---|
| 2005/0097027 A1* | 5/2005 | Kavanaugh | ............ | G06Q 40/04 705/37 |
| 2006/0184254 A1* | 8/2006 | Carpency | ............... | F25J 3/0219 700/30 |
| 2010/0332273 A1* | 12/2010 | Balasubramanian | .. | G06Q 10/08 705/332 |
| 2012/0254092 A1* | 10/2012 | Malov | ................ | G06O 30/0201 706/52 |

OTHER PUBLICATIONS

Charnes, A., et al. "Chance-Constrained Programming"; Management Science, 6 (1), 73-79, Oct. 1959.

Cretien, P.D., "Trading option break-even prices", www.futuresmag.com/2011/08/31/trading-option-beak-even-prices. Retrieved from Internet Jan. 18, 2016.
Grossman, I.E., et al. "Generalized Disjunctive Programming: A Framework for Formulation and Alternative Algorithms for MINLP Optimization" Mixed Integer Nonlinear Programming. IMA Volumes in Mathematics and its Applications. 154: 93-115.
Ji, X., et al., "Integrated Operational and Financial Hedging for Risk Management in Crude Oil Procurement", Industrial & Engineering Chemistry Research, 54(37): 9191-9201 (2015).
Kallestrup, K.B., et al., "Decision support in hierarchical planning systems: The case of procurement planning in oil refining industries", Decision Support Systems; 68:49-63 (2014).
Oddsdottir, T.A., et al., "Procurement planning in oil refining industries considering blending operations"; Computers & Chemical Engineering; 58:1-13 (2013).
Racine, J.S., "Nonparametric Econometrics: A Primer, vol. 3"; Foundations and Trends in Econometrics (2008).
Varvarezos, D.K., "Optimal Solution-Range Analysis in Production Planning: Refinery Feedstock Selection" Industrial & Engineering Chemistry Research, 47:8282-8285 (2008).
Zhang, J., et al. "Simultaneous Optimization of Crude Oil Blending and Purchase Planning with Delivery Uncertainty Consideration", Industrial & Engineering Chemistry Research, 51(25):8453-8464 (2012).
Nelsen, Roger, B., "An Introduction to Copulas" Springer Series in Statistics $2^{nd}$ Edition (2006). https://books.google.com/books?id=yexFAAAAQBAJ&printsec=frontcover#v=onepage&q&f=false.
Kroese, Dirk P., et al., "Handbook of Monte Carlo Methods" Wiley Series in Probability and Statistics (2011). https://books.google.com/books?id=Trj9HQ7G8TUC&printsec=frontcover#v=onepage&q&f=false.
Yang, Yu, et al., "Integrated Crude Selection and Refinery Optimization Under Uncertainty", AIChE Journal, 62 (4), 1038-1053 (2015).
International Search Report and Written Opinion for PCT/US2017/024463 dated May 19, 2017 entitled "Robust Feedstock Selection System for the Chemical Process Industries Under Market and Operational Uncertainty".
International Preliminary Report on Patentability for PCT/US2017/024463 dated Oct. 23, 2018 entitled "Robust Feedstock Selection System for the Chemical Process Industries Under Market and Operational Uncertainty".

\* cited by examiner

INPUT TO 140

| * TABLE | BUY | | | | | | | | |
|---|---|---|---|---|---|---|---|---|---|
| * | Raw Material Purchases | | | | | | | | |
| | TEXT | MIN | MAX | FIX | COST | WGT GROUP | LIQ | API | ISUL |
| * | | (*000 BPD) | (*000 BPD) | (*000 BPD) | $/BBL | | | | |
| * | CRUDE OIL PURCHASES | | | | | | | | |
| AMM | Amenam | 0.000 | 500 | | 79.420 | 1.00 | 1.00 | 39.0 | 0.090 |
| AMN | Amna | 0.000 | 500 | | 79.080 | 1.00 | 1.00 | 37.4 | 0.104 |
| AZL | Azeri Light | 0.000 | 500 | | 79.940 | 1.00 | 1.00 | 34.6 | 0.140 |
| BRL | Brass Light | 0.000 | 500 | | 79.760 | 1.00 | 1.00 | 36.3 | 0.130 |
| CAB | Cabinda | 0.000 | 500 | | 77.350 | 1.00 | 1.00 | 33.1 | 0.130 |
| EKO | Ekofisk | 0.000 | 500 | | 79.980 | 1.00 | 1.00 | 37.5 | 0.219 |
| ESC | Escravos | 0.000 | 500 | | 80.080 | 1.00 | 1.00 | 33.4 | 0.170 |
| ESN | Escalante | 0.000 | 500 | | 77.820 | 1.00 | 1.00 | 23.2 | 0.160 |
| ETA | Etame | 0.000 | 500 | | 78.030 | 1.00 | 1.00 | 35.6 | 0.069 |
| FOR | Forcados | 0.000 | 500 | | 80.630 | 1.00 | 1.00 | 29.7 | 0.190 |
| FRT | Forties | 0.000 | 500 | | 83.520 | 1.00 | 1.00 | 44.7 | 0.170 |
| NGL | Nigerian Light | 0.000 | 500 | | 80.150 | 1.00 | 1.00 | 32.7 | 0.180 |
| NGM | Nigerian Heavy | 0.000 | 500 | | 78.850 | 1.00 | 1.00 | 27.6 | 0.190 |
| NMB | Nemba | 0.000 | 500 | | 82.120 | 1.00 | 1.00 | 40.3 | 0.180 |
| PAL | Palanca | 0.000 | 500 | | 79.650 | 1.00 | 1.00 | 37.3 | 0.178 |
| QIB | Qua Ibo | 0.000 | 500 | | 79.920 | 1.00 | 1.00 | 35.5 | 0.122 |
| RAB | Rabi Blend | 0.000 | 500 | | 79.030 | 1.00 | 1.00 | 32.3 | 0.085 |
| RBL | Rabi Light | 0.000 | 500 | | 79.030 | 1.00 | 1.00 | 37.1 | 0.141 |
| SWT | Sweet Crude Mix | 0.000 | | | | | | | |
| * | | | | | | | | | |
| ANS | Alaska NS | 0.000 | 500 | | 75.250 | 2.00 | 1.00 | 31.9 | 0.930 |
| ARH | Arab Heavy | 0.000 | 500 | | 72.280 | 2.00 | 1.00 | 27.7 | 2.880 |
| ARL | Arab Light | 0.000 | 500 | | 75.450 | 2.00 | 1.00 | 32.8 | 1.890 |
| B17 | BCF-17 | 0.000 | 500 | | 70.400 | 2.00 | 1.00 | 16.9 | 2.530 |

FIG. 1B

OUTPUT FROM 160

| *TABLE | SCCU | | | | | |
|---|---|---|---|---|---|---|
| * | | | | | | |
| | TEXT | BAS<br>Base Case<br>Yields | FDR<br>Feed Rate<br>Effects | RTT<br>Riser Top<br>Temp | PHT<br>Feed<br>Preheat | COL<br>Cooler<br>Duty<br>MMBTU |
| * | | | | | | |
| RABPLCO | VABP | -90.4859 | 32.6956 | 1.1737 | 2.0120 | 2.5346 |
| * | SLR Recursion Rows | | | | | |
| RBALSLR | Recursion Balance | -0.0872 | 0.0540 | 0.0022 | 0.0043 | 0.0051 |
| RSPGSLR | Spec Gravity | -0.0870 | 0.0214 | 0.0021 | 0.0041 | 0.0048 |
| RSPVSLR | Specific Volume | -0.0874 | 0.0865 | 0.0023 | 0.0045 | 0.0054 |
| RAPISLR | API Gravity | -0.8992 | 5.1385 | 0.0396 | 0.0749 | 0.0896 |
| RSULSLR | Sulfur wt% | -0.0253 | -0.0660 | 0.0004 | 0.0007 | 0.0009 |
| RVIISLR | Viscosity Index | -2.3128 | -2.6929 | 0.0398 | 0.0755 | 0.0907 |
| *RCCNSLR | ConCarbon wt% | -0.5056 | -0.9969 | 0.0074 | 0.0148 | 0.0178 |
| * | Utility Consumptions | | | | | |
| UBALFUL | FUEL MMBTU | 0.1335 | | | | |
| UBALKWH | POWER KWH | 8.4000 | | | | |
| UBALSTM | STEAM MLBS | 0.0380 | | | | |
| UBALH2O | COOLING WATER MGAL | 0.0115 | | | | |
| UBALCCC | CAT & CHEM $ | 0.1120 | | | | |
| * | Capacity Rows | | | | | |
| CCAPCCU | FCC Feed Rate | 1.0000 | | | | |
| CCAPCRB | Coke Burned, MT | 0.0067 | 0.0002 | 0.0001 | 0.0002 | 0.0002 |
| CCAPFGU | FCC Fuel Gas Make | 0.1446 | 0.0334 | 0.0059 | 0.0007 | 0.0003 |
| CCAPSLU | Slurry Pump Limit BPD | 0.0872 | -0.0540 | -0.0022 | -0.0043 | -0.0051 |
| ZLIMCVN | Conversion Limit | 75.09 | 11.25 | 0.43 | 0.79 | 0.96 |
| ZLIMRTT | Riser Top Temp, °F | 1.005 | | 5.0 | | |
| ZLIMPHT | Preheat Temp, °F | 553 | | | -30.0 | |
| ZLIMCOL | Cooler Duty, MMBTU/hr | 20 | | | | 40.0 |
| ZLIMMAT | MAT Activity | 70 | | | | |
| ZLIML90 | LCN 90% Pt, °F | 344 | | | | |
| ZLIMH90 | HCN 90% Pt, °F | 467 | | | | |
| ZLIMO90 | LCO 90% Pt, °F | 635 | | | | |
| ZLIMAIR | Burning Air, MMSCFD | 373.5 | -2088 | 4.1 | 13.3 | 13.0 |
| ZLIMRGT | Regen Temperature °F | 1.314 | 384 | 2.8 | -1.3 | -7.2 |

| FIG. 1C-I | FIG. 1C-II |
|---|---|

| MAT Catalyst Activity | L90 LCN 90% Point | H90 HCN 90% Point | O90 LCO 90% Point | SPG Feed Spec Gravity | SUL Feed Sulfur wt% | BN2 Feed Basic N2 wt ppm | CCN Feed ConCarb on wt% | ABP Feed VABP degF | NIK Feed Nickel wt ppm | VAN Vanadium wt ppm |
|---|---|---|---|---|---|---|---|---|---|---|
| 6.4274 | | -22.7908 | 14.8915 | -12.8547 | -1.3973 | -9.6690 | -3.2975 | 19.5615 | -3.6887 | -11.7369 |
| | | | | | | | | | | |
| 0.0050 | | | -0.0176 | -0.0291 | -0.0044 | -0.0217 | -0.0060 | 0.0158 | -0.0067 | -0.0233 |
| 0.0050 | | | -0.0170 | -0.0289 | -0.0042 | -0.0202 | -0.0056 | 0.0151 | -0.0063 | -0.0216 |
| 0.0050 | | | -0.0182 | -0.0293 | -0.0046 | -0.0232 | -0.0064 | 0.0165 | -0.0071 | -0.0250 |
| 0.0516 | | | -0.2654 | -0.3150 | -0.0754 | -0.4260 | -0.1151 | 0.2624 | -0.1294 | -0.4746 |
| 0.0014 | | | -0.0050 | -0.0044 | -0.0892 | -0.0034 | -0.0010 | 0.0010 | -0.0010 | -0.0035 |
| 0.1326 | | | -0.0644 | -0.5144 | -0.0659 | -0.3516 | -0.1075 | 0.1852 | -0.1189 | -0.3942 |
| 0.0290 | | | -0.0385 | -0.1341 | -0.0142 | -0.0648 | -0.0194 | 0.0439 | -0.0213 | -0.0687 |
| | | | | | | | | | | |
| | | | | | | | | | | |
| | | | | | | | | | | |
| | | | | | | | | | | |
| | | | | | | | | | | |
| | | | | | | | | | | |
| 0.0000 | | | | 0.0000 | 0.0000 | -0.0001 | 0.0000 | 0.0001 | -0.0001 | -0.0002 |
| 0.0074 | 0.0000 | 0.0000 | 0.0000 | 0.0119 | 0.0026 | -0.0019 | 0.0000 | -0.0126 | 0.0063 | -0.0082 |
| -0.0050 | 0.0000 | 0.0000 | 0.0176 | 0.0291 | 0.0044 | -0.0217 | 0.0060 | -0.0158 | 0.0067 | 0.0233 |
| 1.65 | | -4.70 | | -5.21 | -0.69 | -3.90 | -1.19 | 5.08 | -1.33 | -4.43 |
| | | | | | | | | | | |
| | | | | | | | | | | |
| 3.0 | | | | | | | | | | |
| | 40.0 | | | | | | | | | |
| | | -40.0 | | | | | | | | |
| | | | -60.0 | | | | | | | |
| 0.0 | | | | -0.1 | -0.4 | -3.2 | 0.8 | 8.8 | -2.7 | -8.8 |
| 0.0 | | | | 11.8 | 2.3 | 4.7 | 10.6 | -4.0 | -9.6 | -38.3 |

FIG. 1C-II

ROBUST FEEDSTOCK SELECTION SYSTEM FOR THE CHEMICAL PROCESS INDUSTRIES UNDER MARKET AND OPERATIONAL UNCERTAINTY

BACKGROUND

Process industries with variable feeds, including refineries and petrochemical plants, process feedstocks, such as crudes and chemicals, into a range of blended products, such as gasoline and diesel. The process industries (e.g., refineries) must plan and schedule activities in order to process feedstocks into the range of blended products. The planning of these activities, hereinafter referred to as "operations planning," includes deciding which blended products to produce, and selecting which feedstocks to procure to meet the specification and demand requirements for producing these blended products. The specific decisions involving selecting which feedstocks (and amounts of the feedstocks) to procure are made with the focus of optimizing the profitability and operation efficiency of producing the blended products, within the parameters of the specification and demand requirements for the blended products. As such, these feedstock selection decisions must consider the different sources of uncertainty (risk) related to procuring the feedstocks, including market conditions (e.g., price and supply and demand projections), operation conditions (e.g., storage and blending equipment availability and capacity), and other uncertain conditions (e.g., assay quality). To manage such uncertainties/risks, the feedstock selection decisions often include selecting feedstocks to procure both on long-term contracts and in the spot market.

Selection decisions regarding which feedstocks to procure on long-term contracts and which feedstocks to procure in the spot market are often made in different planning steps. For example, selection decisions to procure feedstocks on long-term contracts may be made in one planning step, months in advance of processing the procured feedstocks in blending operations. These selection decisions are often made with uncertain knowledge of the future conditions of the spot market, which is constantly fluctuating in price and availability based on the current state of the supply and demand in the market. This planning step often results in procuring a majority of the feedstocks for the blended products as a basic hedging strategy, since procurement of feedstocks on long-term contracts ensures: (i) feed availability, (ii) cost assurance, and (iii) a potential price discount. Further, operations planning often includes a second procurement step, in which feed selection decisions are made to procure some feedstocks in the short-term from the spot market, in order to include in the hedging strategy profits from upsides in the spot market. However, as these spot market decisions are made in the short-term, these decisions must be made with greater consideration of the uncertainties related to operation conditions, such as equipment availability for storing and blending the feedstocks. For operations planning to optimize profitability and operation efficiency in producing blended products, the feedstock selection decisions must be made in a manner that optimizes the combination of feedstock procurement on long-term contracts and feedstock procurement in the spot market based on the respective uncertainties in market, operation, and other conditions.

Operations planning in the process industries is typically modeled as a mixed-integer, non-linear optimization problem (MINLP), which may contain tens to hundreds of thousands of equations and variables. Note, these models include uncertain input parameters which represent market condition uncertainties (e.g., price and supply and demand projections), operation condition uncertainties (e.g., storage and blending equipment availability and capacity), and other uncertainties (e.g., assay quality) regarding feedstock selection. The little art that exists regarding modeling feedstock procurement in the process industries primarily focuses on traditional techniques, such as deterministic decision making, stochastic programming, and robust optimization; for example, Yang, Y., et al., "*Integrated Crude Selection and Refinery Optimization under Uncertainty*," AIChE Journal, 62 (4), 1038-1053 (2015), hereinafter referred to as "Yang," which considers uncertainty in crude-oil quality (specifically, vacuum residue yield and sulfur fraction of gas oil) and employs a two-stage stochastic programming approach in which all crude purchases are determined in the first stage and operating conditions are determined in the second stage. Note, the few other known publications include: Ji, X., et al., "*Integrated Operational and Financial Hedging for Risk Management in Crude Oil Procurement*," Industrial & Engineering Chemistry Research, 54, 9191-9201 (2015), hereinafter referred to as "Ji" (one-stage stochastic programming approach to crude-oil procurement under raw-material price uncertainty); Oddsdottier, T. A., et al., "*Procurement planning in oil refining industries considering blending operations*," Computers & Chemical Engineering, 58, pages 1-19 (2013) (deterministic approach to procurement planning); Kallestrup, K. B., et al., "*Decision support in hierarchical planning systems: The case of procurement planning in oil refining industries*," Decision Support Systems 68, pages 49-63 (2014) (deterministic hierarchical structured approach to procurement planning); Zhang, J., "*Simultaneous Optimization of Crude Oil Blending and Purchase Planning with Delivery Uncertainty Consideration*," Industrial & Engineering Chemistry Research, 51, pages 8453-8464 (2012) (flexibility analysis of crude delivery times), and Varvarezos, D. K., "*Optimal Solution-Range Analysis in Production Planning: Refinery Feedstock Selection*," Industrial & Engineering Chemistry Research, 47, 8282-8285 (2008) (flexibility indices for evaluating refinery feedstocks). Note, none of these publications address the problem of feedstock selection under uncertainty using a quantitatively derived feed partitioning procedure of long-term and short-term feedstock selection based on uncertainty considerations. Further, none of these publications address the problem of feedstock selection under uncertainty using a probabilistic breakeven analysis procedure. Even further, none of these publications specifically address the problem of feedstock selection combining the above two procedures into a comprehensive sequence of steps that address both long-term and short-term feedstock selection.

Moreover, there are various issues associated with applying traditional techniques to operations planning models to optimize feedstock procurement. Deterministic techniques use a single set of expected values for input parameters, such as purchase price, equipment availability/capacity, and assay quality, which are rarely known with complete certainty. Such techniques based on a single set of uncertain outcomes do not hedge against the risks associated with these parameters when selecting feedstocks for procurement. More advanced techniques which hedge against uncertainty, such as stochastic programming, may be computationally impractical and infeasible in the modeling of complex, real-world problems due to the size and complexity of the complete model (e.g., a full refinery model in a stochastic-programming framework is likely to be computationally-intractable). In addition, stochastic programming techniques are often poorly understood by non-experts, and complex decomposition strategies, which often do not scale well in real-world use cases, must be applied to the model to attempt to obtain an optimal solution. For example, Yang considers 10 candidate crudes and 120 scenarios in a two-stage stochastic programming framework, and uses nonconvex generalized Benders decomposition to solve two example problems. In the case of a simplification such as the one used by Ji, the modeling of feedstock procurement as a single stage is inconsistent with real-world decision making, which, as described above, may make long-term contract decisions and spot market decisions for procuring feedstocks in different steps, each of which involves different considerations for risk (uncertainty). Note that Yang also only considers feedstock procurement in one stage of a stochastic programming model.

As such, there is a need in the process industry for a technique to optimize feedstock procurement decisions, which hedges against the risk of uncertainties, consistent with the real-world steps of feedstock decision making, and does so while maintaining computationally tractable modeling without the need for complex decomposition techniques.

SUMMARY OF THE INVENTION

The present invention addresses the issues of optimizing feedstock procurement decisions in process industries with variable feeds. The present invention, unlike the art described above, models feedstock procurement decision making in two stages, consistent with the real-world steps of feedstock procurement decision making. The present invention evaluates these two stages at separate intervals throughout the feedstock planning process. The first stage (the strategic decision stage) determines a set of robust feedstocks to purchase on long-term contracts, while the second stage (the tactical decision stage) determines a set of robust feedstocks to purchase in the short-term in the spot market. In each stage, the present invention considers the different sources of uncertainty (e.g., market conditions, operation conditions, assay quality, and the like) relevant to the given stage, by, for example, simulating a multitude of outcomes (also referred to as "uncertain outcomes") based on different expected values or realization values for the uncertain input parameters of the given stage. Embodiments of the present invention then rely on the use of chance-constrained optimization in the first stage, and perform a breakeven analysis in the second stage to further hedge against these sources of uncertainties in the feedstock procurement decision making process. Further, embodiments of the present invention hedge against these sources of uncertainties in each stage while maintaining computationally-tractable problem instances (simulation cases), without the need for complex decomposition strategies, even when modeling complex real-world problems.

Specifically, the present invention is directed to a computer system and computer-implemented method for optimizing feedstock selection planning for an industrial process. The computer system and method, in a first stage, determine a set of robust feedstocks to procure on long-term contracts. In the first stage, the computer system and method model feedstock procurement on long-term contracts as a first set of simulation cases of a non-linear model. In some embodiments, the non-linear model is a mixed-integer, non-linear optimization problem (MINLP) model. The simulation cases are based on a set of uncertain input parameters contained in the model that represent uncertainty related to selecting feedstocks to procure on long-term contracts (e.g., market conditions). In some embodiments, each simulation case comprises an independent instance of the MINLP model with different realization values provided for the set of uncertain input parameters contained in the model. In example embodiments, the first set of simulation cases are generated by fitting a multivariate distribution to the uncertain input parameter data using kernel density estimation (KDE), and, then, applying a Monte-Carlo sampling to the multivariate distribution. In other example embodiments, the first set of simulation cases are generated by applying a copula-based approach to capture correlations among the uncertain input parameters, and, then, applying a Monte-Carlo sampling to the captured correlations.

The computer system and method solve each simulation case of the first set of simulation cases, in parallel, to model different uncertain feedstock outcomes for feedstock procurement on long-term contracts. The modeled outcomes include optimal feedstocks, feedstock volumes, and operation conditions with respect to the given simulation case. The computer system and method, then, perform a probabilistic analysis of the different modeled outcomes from the first set of simulation cases to determine a set of robust feedstocks, and respective feedstock volumes, to procure on long-term contracts. In some embodiments, the computer system and method performing the probabilistic analysis of the different modeled outcomes comprises selecting robust feedstocks from the optimal feedstocks respective to each modeled outcome, and then, establishing a procurement volume for each selected robust feedstock. In these embodiments, the selecting of the robust feedstocks includes generating a probabilistic feed slate distribution of the optimal feedstocks respective to the modeled outcomes. In these embodiments, the selecting of the robust feedstocks further includes applying a threshold probability to the probabilistic feed slate distribution to select a subset of the distributed feedstocks as robust feedstocks.

In these embodiments, the establishing of a procurement volume for each selected robust feedstock includes the computer system and method estimating a multivariate (i.e., joint) cumulative distribution function (CDF). The estimated CDF indicates, for a set of robust feedstocks, the joint distribution of the feedstock volumes provided from the different modeled outcomes. In these embodiments, the establishing of the procurement volume for each selected robust feedstock further includes the computer system and method determining joint chance constraints that are derived from the estimated CDF to restrict the procurement volume of each robust feedstock to a conservative procurement volume. The computer system and method, then, generate a new robust base case of the non-linear model, including the joint chance constraints and a capacity-fulfillment constraint, with respect to the robust feedstocks. The computer system and method solve the new robust base case to determine the optimal feedstock volumes of the respective robust feedstocks to procure on long-term contracts.

The computer system and method may further perform validation on the Stage-1 procurement decisions. In some embodiments, the validation may comprise determining feedstocks based on a deterministic approach, and comparing the expected profits of these feedstocks to the expected profits of the robust feedstocks determined in Stage 1.

In some embodiments, the computer system and method, in a second stage, determine a set of robust feedstocks to procure in the spot market. In the second stage, the computer system and method model feedstock procurement in the spot market as a second set of simulation cases of the non-linear model (e.g., MINLP model). These simulation cases are based on a set of uncertain input parameters contained in the model that represent uncertainty related to selecting feedstocks to procure in the spot market (e.g., operation conditions and assay quality). In some embodiment, each simulation case comprises an optimization problem based on an independent instance of the MINLP model with different realization values provided for the set of uncertain input parameters. In example embodiments, the second set of simulation cases are generated by fitting a multivariate distribution to the uncertain input parameter data using kernel density estimation (KDE), and, then, applying a Monte-Carlo sampling to the multivariate distribution. In other example embodiments, the second set of simulation cases are generated by applying a copula-based approach to capture correlations among the uncertain input parameters, and, then, applying a Monte-Carlo sampling to the captured correlations.

For each simulation case of the second set of simulation cases, the computer system and method solve the given simulation case (i.e., as a respective base case) with the determined set of robust feedstocks from the first stage. The solution of the given base case determines the optimal value of the objective function for the given base case. The computer system and method, for each spot feedstock of a set of available spot feedstocks, then, generate a respective feedstock case by forcing a fixed procurement volume of the given spot feedstock into the given base case, and solve the respective feedstock case to determine the optimal objective function value of that feedstock case. The computer system and method, then, calculate a breakeven price for the respective feedstock in regard to the given base case based on: (i) the determined optimal objective function value for the given simulation case (i.e., the given base case), and (ii) the determined optimal objective function value for the respective feedstock case. The computer system and method repeat this process to determine a breakeven price for each spot feedstock with respect to each simulation case. The computer system and method generate an empirical cumulative distribution function (ECDF) for each spot feedstock representing each determined breakeven price in relation to a respective risk level (or confidence level) for breakeven analysis. The computer system and method further rank each spot feedstock of the set of available spot feedstocks by defining the incremental profit value between the market value and each determined breakeven price for the given feedstock. The computer system and method indicate, based on the ECDFs and ranking, a set of robust spot feedstocks to procure in the spot market. The computer system and method may then determine the necessary operating conditions to optimally process the determined feedstocks from each stage to produce the set of desired products.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-1C depict an example process modeling system, and sample input and output data of the example process modeling system, for performing robust feedstock selection in embodiments of the present invention. Note, FIG. 1C illustrates the sample output data in a chart in FIGS. 1C-I and 1C-II, where FIG. 1C-I illustrates the left of the chart and FIG. 1C-II illustrates the right of the chart.

DETAILED DESCRIPTION OF THE INVENTION

A description of example embodiments of the invention follows. The teachings of all patents, published applications and references cited herein are incorporated by reference in their entirety.

Operations planning in chemical process industries with variable feeds (e.g., refineries) includes feedstock selection for the plant or refinery operations. The feedstock selection planning involves determining particular feedstocks (e.g., crudes) to procure (purchase), and the processing of the particular feedstocks to meet specifications and demand requirements, in a manner that optimizes the plant or refinery operations. To make these determinations, the feedstock selection planning must account for different uncertainties related to the procurement and processing of the feedstocks, such as market uncertainty (e.g., feedstock pricing, supply, and demand), operation uncertainty (e.g., equipment availability and capacity), and other uncertainty (e.g., assay quality). In the feedstock selection planning, the decisions on which feedstocks to procure typically require determining a set of feedstocks to purchase in advance on long-term contracts, and, further, determining a set of feedstocks to purchase in the short-term in the spot market. The present invention provides a feedstock selection method (strategy or process) that provides long-term contract decisions for feedstock procurement (in a first stage) and spot market decisions for feedstock procurement (in a second stage) based on the different uncertainties relevant to the respective decisions.

Process Modeling System

Figure 1A:
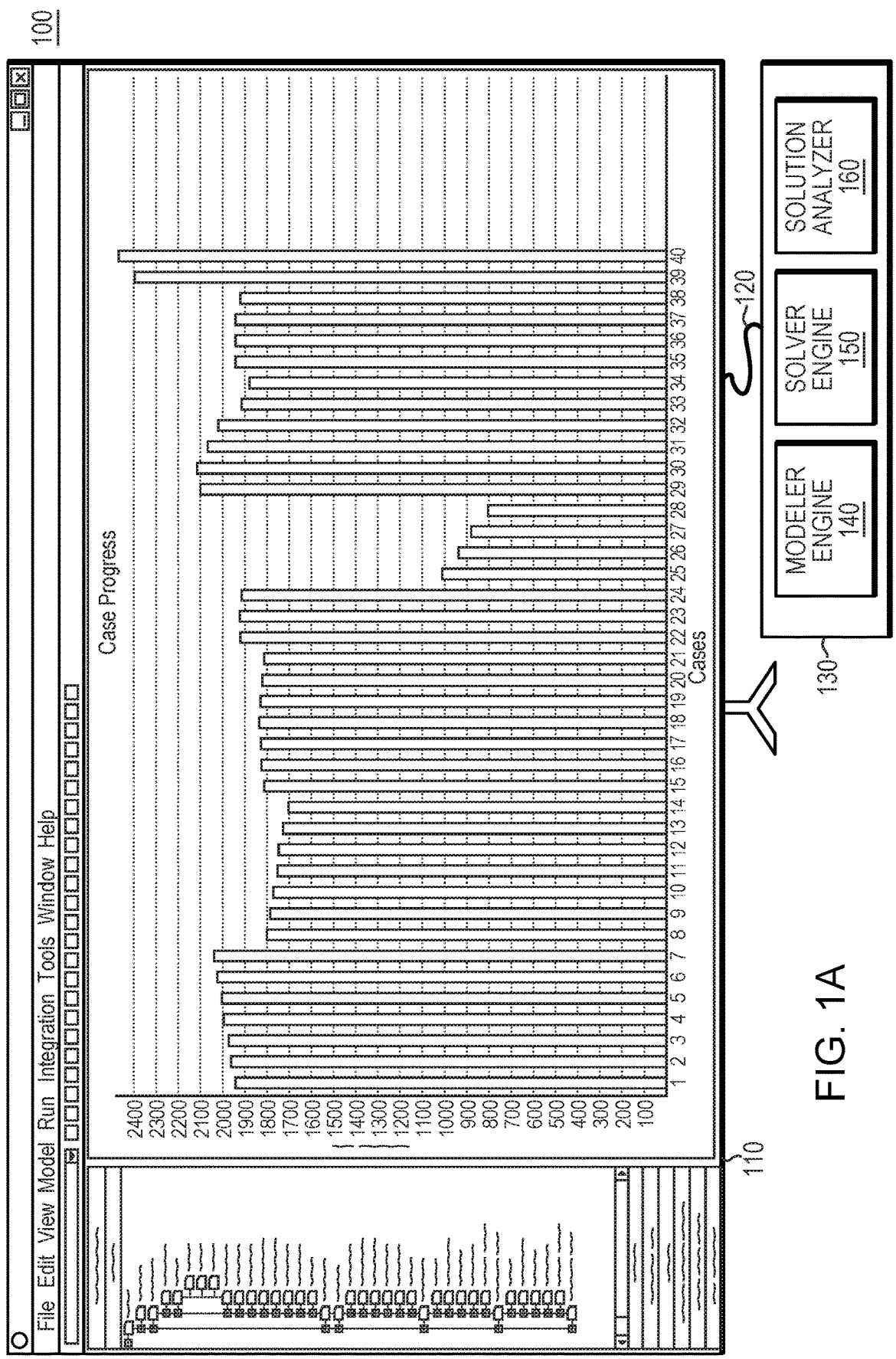

FIG. 1A is an example process modeling system 100 for executing example embodiments of the feedstock selection methods of the present invention. In some embodiments, the system 100 is PIMS-AO® by Aspen Technologies, Inc., Bedford, Mass. In the embodiment of FIG. 1A, system 100 includes a user interface display 110, which is communicatively connected via interface connection 120 to a processing environment 130. The interface connection 120 is displayed as a wired interface, however, in some embodiments the interface connection 120 may be a wireless connection, such as WiFi or Bluetooth. The processing environment 130 may be configured with one or more processors comprising at least the Modeler Engine 140, Solver Engine 150, and Solution Analyzer 160.

The Modeler Engine 140 generates linear and non-linear models for defining process industry problems, such as feedstock selection planning. Specifically, the Modeler Engine 140 provides parameters for a user or system to define feedstock selection planning as a non-linear model (e.g., an MINLP), including conservation equations (mass and such), functions (e.g., objective functions), variables, constraints (variable, equation, and function upper and lower limits), and the like. These parameters may be displayed at user interface display 110 for the user or system to define the model. For example, the Modeler Engine 140 may display parameters for a user to define an MINLP model with a set of uncertain input parameters for Stage 1 of the present invention, and for the user to also define an MINLP model with a set of different uncertain input parameters for Stage 2. In some embodiments, the defined model may be stored in memory at, or communicatively coupled to, processing environment 130, and may be loaded to the Modeler Engine 140 at a later time for generating model instances.

By "uncertain input parameters," a representation of the various risks or uncertainties in market conditions, operation conditions, and other conditions is meant.

The Modeler Engine 140 further provides parameters for the user or system to provide data (e.g., realization data for the uncertain input parameters) to the model to generate instances of the model (e.g., simulation cases). The input data may be provided by the user or system to the Modeler Engine 140, by various means, including from a user or system entering the data via a screen of the user interface display 110, providing a spreadsheet or other format of the data via the user interface display 110, or by communicating with other plant or refinery applications to receive live or historian plant/refinery data. FIG. 1B illustrates a spreadsheet of sample input data for feedstock supply options, which may be provided in some example embodiments of the present invention to generate instances of the model. The Modeler Engine 140 generates the instances of the model, based on the provided data, using one or more configured techniques or approaches, such as a probabilistic estimation approach, copula-based approach, and Monte-Carlo approach, which may be a default approach or selected by a user or system via the user interface display 110. In some embodiments, the generated model instances may be stored in memory at, or communicatively coupled to, the processing environment 130, and may be loaded to the Solver Engine 150 at a later time for processing. Note, as the defined models of Stage 1 and Stage 2 of the present invention are defined with a different set of uncertain input parameters (representing market, operation, and other plant/refinery uncertainties), the Modeler Engine 140 generates a different set of model instances for each stage.

The Solver Engine 150 loads and optimally solves the model instances generated by the Modeler Engine 150 to provide a modeled outcome for each model instance. The Solver Engine 150 may solve the model instances in parallel (via parallel processing), if the model instances are independent. Each modeled outcome may include the optimal feedstock makeup, respective feedstock volumes, and process unit operating conditions for processing the optimal feedstocks for the respective model instance (e.g., based on the provided realization data for the defined uncertainties/risks as represented by the uncertain input parameters of that model instance). The Solution Analyzer 160 then performs analysis, such as probabilistic analysis, on the solutions (i.e., modeled outcomes) from the different model instances.

For example, in regard to feedstock selection, the Solution Analyzer 160, in the first stage, may provide graphs (e.g., feed slate distributions and ECDFs), or other visual outputs displayed on the user interface display 110, to present to the user the probabilistic information regarding the different solutions, such as the risk associated with the optimal feedstocks determined in the different solutions. The Solution Analyzer 160 may further generate, apply, or enable a user or another system to apply restrictions, or other data parameters, to the probabilistic information (e.g., thresholds and chance-constraints) to select a subset of the probabilistic information for further analysis. The Solution Analyzer 160 may further generate new models or model instances based on the probabilistic information, or restricted probabilistic information, for analyzing the probabilistic information (e.g., new base cases for analyzing/selecting contract feedstocks from the restricted probabilistic information). The Solution Analyzer 160 then provides the results from analyzing the modeled outcomes, such as the selected contract feedstocks, to a user (e.g., as an economic priority ranking or other ordering in a spreadsheet or on the user interface display screen 110), or to other refinery or plant systems (applications), such as a blending control system, a plant process control system, and any other such control system, to program the refinery or plant operations. FIGS. 1C-I and 1C-II (together) illustrate a spreadsheet of sample data for a process unit model, which may be provided in some example embodiments of the present invention as part of the results.

Example Operation Conditions

Figure 2:
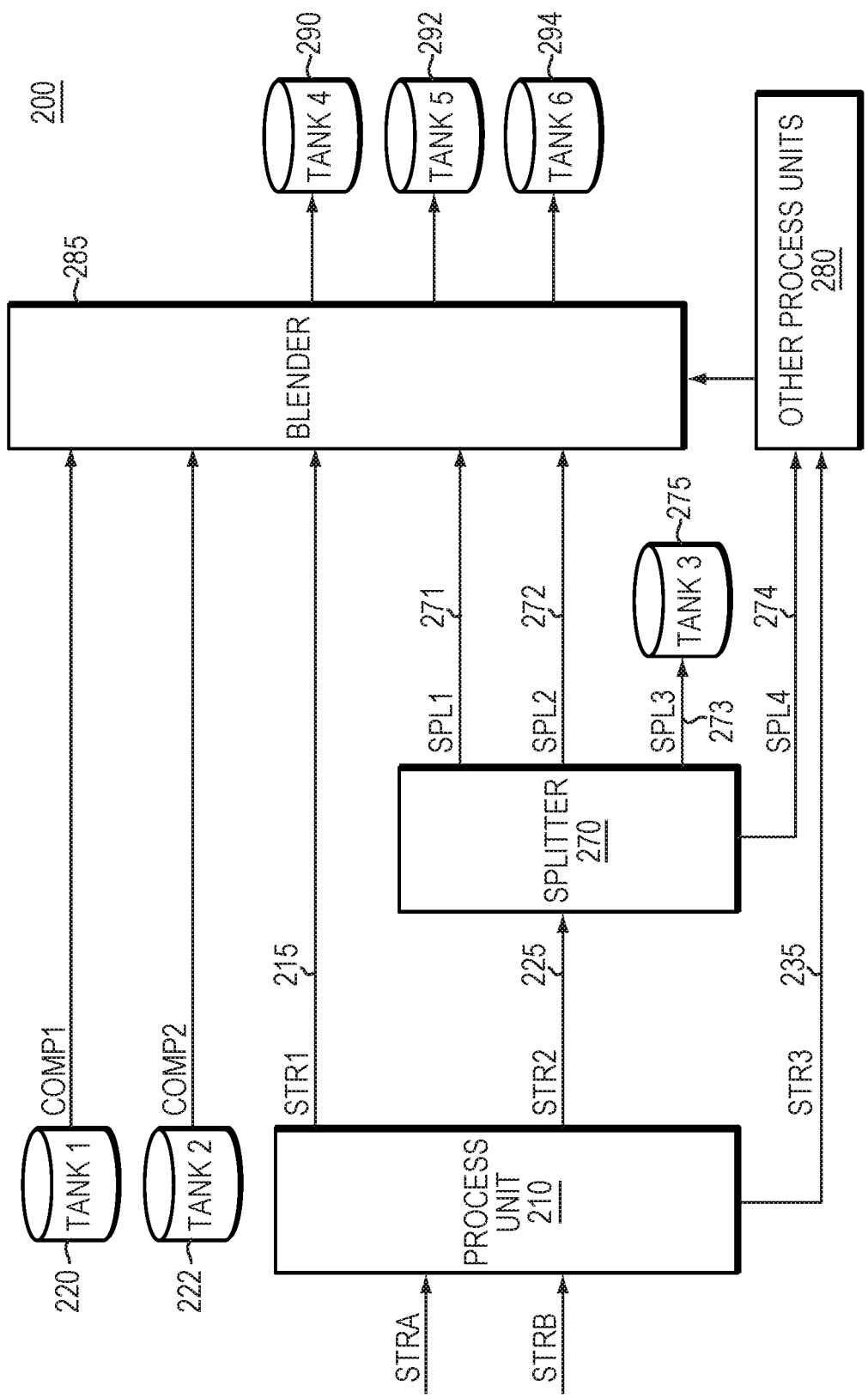
FIG. 2 depicts example operation conditions in embodiments of the present invention.

FIG. 2 depicts example operations 200 at a refinery or petrochemical plant in embodiments of the present invention. Specifically, FIG. 2 illustrates an example configuration for rundown blending operations 200, which includes two component tanks 220 and 222; process units 210 and 280; splitter 270; streams 215, 225, 235, 271, 272, and 273; blending tank 275; blender 285; and finishing tanks 290, 292, and 294. The present invention must consider the risks (i.e., uncertainties) related to the rundown blending operations 200 when making robust feedstock selection decisions for the refinery or petrochemical plant. For example, the present invention, when making decisions to procure feedstocks in the spot market (in Stage 2), must consider the risk that the process unit 210, splitter 270, and blending tank 275 may not be available to blend the considered spot feedstocks into a product that meets specification and demand requirements. That is, other feedstocks already procured on long-term contracts (in accordance with the feedstock selection methods of Stage 1 of the present invention) may need to use the process unit 210, splitter 270, and blending tank 275, at the same period as the feedstocks being considered for procurement in the spot market. Thus, the present invention must consider the risk that some process units may be unavailable when deciding whether to procure the considered spot feedstocks in the spot market. For another example, the present invention must consider the risk that component tanks 220 and 222 will not have the capacity to hold the considered spot feedstocks. That is, the present invention must consider the risk that other feedstocks already procured on long-term contracts may still be present in the component tanks 220 and 222 when the considered spot feedstocks would need to be placed in these tanks.

Further, the present invention, as part of selecting robust feedstocks to procure on long-term contracts and the spot market, also provides the optimal operating conditions for processing the procured feedstocks. In the embodiment of FIG. 2, these optimal operating conditions require the scheduled use of certain components of the rundown blending operations 200 under certain conditions. For example, the present invention may determine the selected robust feedstocks must be optimally mixed and processed in a process unit 210 (e.g., separation with a particular temperature profile), splitter 270 (e.g., removing sulfur content in a hydro-treating operation), further processing in other process units 280 (e.g., chemically altering this stream), and subsequently blended into a particular product in blending operations (blender) 285 (e.g., with a particular compositional recipe). These optimal operating conditions are provided to refinery or plant applications, such as a blending control system, a plant process control system, and any other such control system, to program the rundown blending operations 200, including process unit 210, splitter 270, and blender 285, to process the procured feedstocks into the particular blended products. In some embodiments, the optimal operating conditions are provided from the process modeling system 100 of FIG. 1A and programmed (automatically or by a user) at one or more plant or refinery control systems.

Timescales for Evaluating Feedstock Selection

Figure 3:
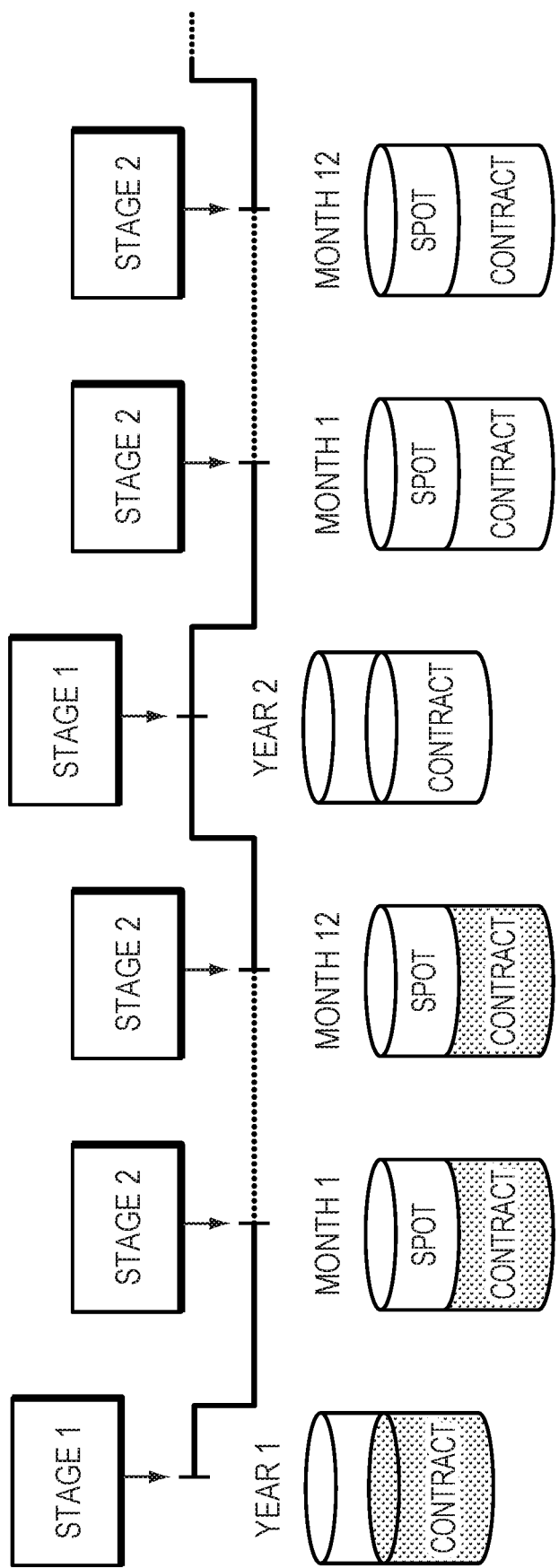
FIG. 3 depicts different timescales for evaluating feedstock selection in embodiments of the present invention.

FIG. 3 depicts the different timescales for evaluating the stages (Stage 1 and Stage 2) of feedstock selection in embodiments of the present invention. In Stage 1 (the strategic decision stage), the present invention evaluates the selection of feedstocks (e.g., crudes) to procure on long-term contracts over a long time scale. For example, as shown in FIG. 3, the present invention may evaluate such selections of feedstocks once a year (e.g., Year 1, Year 2, and the like) to make respective feedstock planning decisions. Further, the present invention must make these decisions months prior to the refinery or plant operations that process the selected feedstocks, and these decision are commonly made with uncertain knowledge of the spot market, which is constantly fluctuating in price and availability based on the current state of the supply and demand in the market. Feedstock procurement on long-term contracts represents a larger fraction of the feedstock slate (e.g., 60%) for refinery or plant operations as a basic hedging strategy, since procurement of feedstocks on long-term contracts ensures: (i) feed availability, (ii) cost assurance, and (iii) a potential price discount.

In Stage 2 (the tactical decision stage), the present invention evaluates the selection of feedstocks to procure in the spot market over a shorter time scale. For example, as shown in FIG. 3, the present invention may evaluate the selection of feedstocks in the spot market on a monthly basis (e.g., Year 1, Month 1; Year 1, Month 2; . . . ; Year 1, Month 12; Year 2, Month 1; Year 2, Month 2; . . . ; Year 2, Month 12, and the like) to make respective feedstock planning decisions, taking into account the standing long-term contract decisions. Further, the present invention must make the spot market decisions in a short timeframe before the refinery or plant operations processes these selected feedstocks, but after the uncertainty in spot market feedstock prices has been resolved. As such, in Stage 2, the present invention is more concerned with the refinery or plant operations (and less on strategic purchasing decisions for long-term price benefits). Thus, in Stage 2, the present invention focuses more on uncertainty in operation conditions (e.g., equipment availability) and other uncertainty (e.g., assay quality), and less on market uncertainties (e.g., price). Feedstock procurement in the spot market represents a smaller fraction of the feedstock slate (e.g., 40%), and is included in the hedging strategy in order to profit, in the short-term, from upsides in the spot market.

Overview of Feedstock Procurement Method

Figure 4:
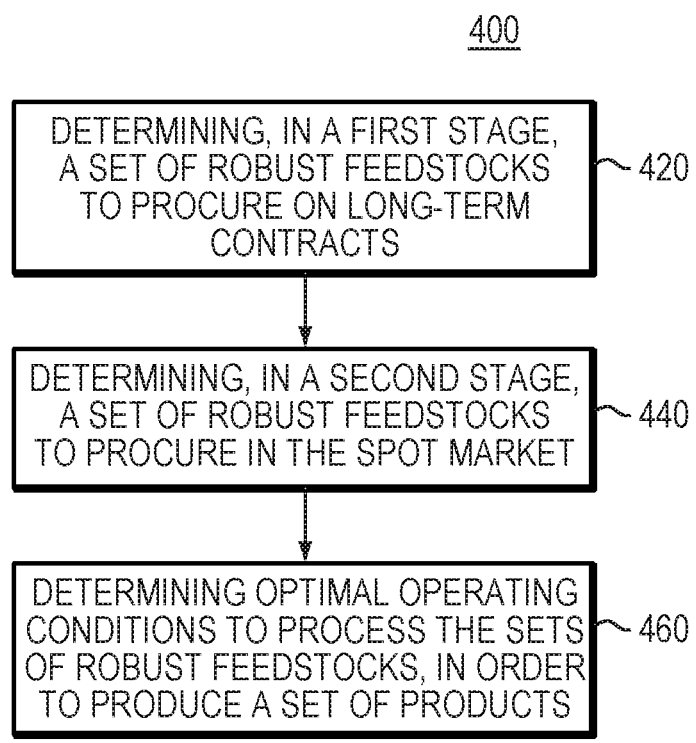
FIG. 4 is a flowchart of an overview method for feedstock selection in embodiments of the present invention.

FIG. 4 is a flowchart of an overview method 400 for feedstock selection planning in embodiments of the present invention. The method 400 begins at step 420 by determining, in a first stage, a set of robust feedstocks to procure on long-term contracts. To determine these decisions, the method generates, and optimally solves, multiple instances of a non-linear model of an operations planning problem, based on different realizations for the uncertain input parameters of the model. The method 400, at step 420, uses the optimal solutions from these instances as probabilistic information that is analyzed to determine robust feedstocks, and respective volumes of the feedstocks, to be considered for long-term contract decisions. Specifically, the method 400, at step 420, provides the determined robust feedstocks to a generated base case, which is solved to obtain the respective volumes of these robust feedstocks to procure on long-term contracts. This step, 420, of FIG. 4 is described in further detail in FIG. 5A.

The method 400 continues at step 440 by determining, in a second stage, a set of robust feedstocks to procure in the spot market. To determine these decisions, the method 400 generates new instances of the non-linear model, based on different realizations for new uncertain input parameters of the model. For each new instance (one at a time), with the determined contract feedstocks of step 420 as the only feedstocks in the feed slate, the method 400, at step 440, solves the instance as a respective base case. For each base case, the method 400, at step 440, then, solves a set of feedstock cases, each feedstock case generated by forcing a fixed procurement volume of a respective spot feedstock into the given base case. The method 400, at step 440, then, determines the indifference value (or breakeven price) of each spot feedstock based on the relative objective function values of the given base case and the respective feedstock case. The method 400, at step 440, uses breakeven prices, along with risk levels (or confidence levels), for probabilistic analysis to obtain a set of robust spot feedstocks to procure in the spot market. This step, 440, of FIG. 4 is described in further detail in FIG. 6A.

In the method 400, at step 460, the determined sets of robust feedstocks may be used in a new base case to determine the optimal operating conditions to process these feedstocks in order to produce a set of products. Note, although the feedstock selection planning method 400 of FIG. 4 determines robust feedstock selection decisions in two stages, other embodiments of the present invention may determine feedstock selection in any other number of stages (e.g., one stage, or three or more stages).

Further note that the effectiveness of the method 400, specifically step 420, was evaluated by applying the method 400 to a sample refinery plan. The numerical results from this evaluation demonstrate that step 420 of the method 400 provides significant economic benefits, far outperforming deterministic approaches, leading to an increase in profits of more than $7 million on average per year over those deterministic approaches.

Stage 1 of Example Feedstock Procurement Method

Figure 5A:
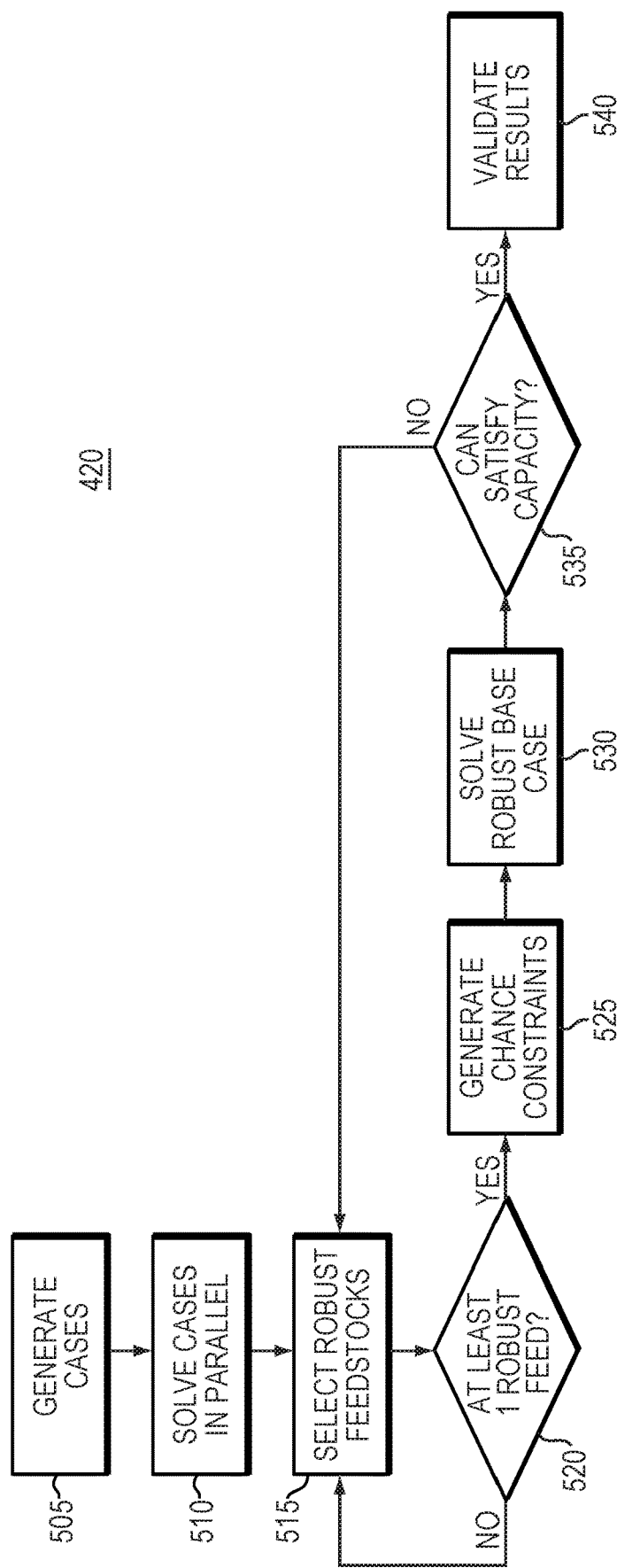
FIG. 5A is a flowchart of a detailed depiction of Stage 1 of the method of FIG. 4.

FIG. 5A is a flowchart of a detailed depiction of Stage 1 of the method 420 of FIG. 4. In Stage 1 (i.e., the strategic decision stage), method 420 determines a set of robust feedstocks to procure on long-term contracts. In some embodiments, the method 420 may be executed as part of a process modeling system 100 (e.g., ASPEN PIMS) as shown in FIG. 1. The method 420 begins at step 505 by generating multiple simulation cases for determining probabilistic information regarding feedstock procurement on long-term contracts. In the embodiments of FIG. 5A, method 420 generates each simulation case as a different and independent instance of the same mixed-integer, non-linear optimization problem (MINLP) model. The general form of an MINLP model, which may contain thousands of equations and variables, is shown in Equations (1)-(3) below, and further described in Grossman, I. E., et al., "*Generalized Disjunctive Programming: A Framework for Formulation and Alternative Algorithms for MINLP Optimization*," Chapter in Mixed Integer Nonlinear Programming, IMA Volumes in Mathematics and its Applications (Eds. Lee, J., et al.), 154, Springer, NY, N.Y., pages 93-115 (2011):

$$\min_{x,y} Z = f(x, y) \quad (1)$$

$$\text{s.t.} \quad (2)$$

$$g_j(x, y) \le 0 \; \forall \; j \in J$$

$$x \in X, y \in Y \quad (3)$$

Equation (1) represents the objective function, in which a differentiable function $f$ of variables x and y is minimized, where x and y are continuous and integer variable vectors, respectively. This function may be of the form $Z = c^T x - d^T y$, where c represents the vector of costs associated with continuous decisions x (e.g., raw material and utility costs, sales prices, etc.), and d represents the vector of costs associated with integer decisions y (e.g., equipment downtime costs, etc.). Note that, in practice, this model may be expressed as a maximization problem since, in operations planning in the chemical process industries, the objective is often to maximize total profit. Equation (2) represents the set of constraints (indexed here by j in set J), and bounds and integrality restrictions on the variables are specified in Equation (3). These constraints may include material balances such as $x^{sales} = x^{production} - x^{inventory}$ and demand-satisfaction constraints such as $x^{sales} \ge D$, where D is the demand (which may be uncertain). The objective function and/or a subset of the constraints will be non-linear.

In method 420, the MINLP model includes uncertain input parameters (e.g., some elements in coefficient vectors c and/or d in Equation (1) above, and/or coefficients or scalar terms in Equation (2), such as demand D) that represent uncertainty related to selecting feedstocks to procure on long-term contracts. This uncertainty includes market uncertainty, such as benchmark-crude prices and crack spreads, and operations uncertainty, such as key equipment availability. The method 420 generates each simulation case (instance of the MINLP model) using different realization data for the uncertain parameters, so as to model different uncertain outcomes. The realization data may be configured via a user interface display 110 of a process modeling system 100 (e.g., by the Modeler Engine 140 loading a spreadsheet with the data or entering the data), retrieved from values stored in memory, or as direct output from a refinery or plant system.

FIG. 1B illustrates a spreadsheet of sample input data for feedstock supply options, which may be used in some embodiments of method 420 to provide the realization data, such as feedstock costs.

Using the configured realization data for the uncertain input parameters as sample points, the method 420 generates the simulation cases (scenarios) by sampling the underlying probability distribution of the uncertain input parameters. If a large number of sample points (e.g., at least 100 points) is configured for the uncertain input parameters, the method 420 fits a multivariate distribution to the uncertain input parameter data using a probabilistic estimation approach, such as kernel density estimation (KDE), as described in Calfa, B. A., et al., "*Data driven individual and joint chance-constrained optimization via kernel smoothing*," Computers & Chemical Engineering, 78, pages 51-69 (2015), hereinafter referred to as "Calfa" (herein incorporated by reference in its entirety) and in Racine, J. S., "*Nonparametric Econometrics: A Primer*," vol. 3, Foundations and Trends in Econometrics, Now Publishers, NJ (2008). If a smaller number of sample points is configured for the uncertain input parameters, this estimation approach (e.g., KDE) for generating the simulation cases is not suitable, and method 420 instead uses another approach, such as a copula-based approach (as further described in Nelsen, R. B., "*An Introduction to Copulas*," Second Edition, Springer Science+Business Media, Inc., NY (2006)), which captures correlations among the uncertain input parameters.

Both approaches (i.e., the distribution-estimation approach and copula-based approach) capture all relationships among the uncertain input parameters, which is an essential consideration for generating meaningful simulation cases. After applying either approach, the method 420 then uses Monte-Carlo sampling (as further described in Kroese, D. P., et al., "*Handbook of Monte Carlo Methods*," John Wiley & Sons, Inc., NJ (2011)) to select specific simulation cases from the respective multivariate distribution or captured correlations. In some embodiments, the user, (e.g., via the user interface display 110 of the process modeling system 100 executing the method 420), may select between these two approaches if the user wishes to override the method 420 making a default selection between the approaches.

In this way, the method 420 utilizes a data-driven, non-parametric, approach for generating the simulation cases, which does not rely on a specific distribution family for the realization data, and, as such, is general enough for simulating any type of uncertainty. Note that in these approaches, the method 420 may exclude certain uncertain input parameters with simple dependencies (e.g., crude prices that are based off of a benchmark crude price) from the relationships captured while generating the simulation cases and, instead, explicitly calculate the values of these uncertain parameters through algebraic relationships within each simulation case.

Next, in FIG. 5A, the method 420, at step 510, loads each generated simulation case (e.g., via a Solver Engine 150 of process modeling system 100, such as PIMS-AO) with no restrictions on the available capacity. Note, the method 420 uses computationally-tractable problem instances (i.e., simulation cases) that do not require complex decomposition strategies. The method 420 then rigorously solves (e.g., via Solver Engine 150 of the process modeling system 100) the loaded simulation cases in parallel to obtain optimal outcomes (results) for each simulation case (based on the configured realization values for the uncertain input parameters). As such, by solving multiple instances of the model with different realizations for the uncertain input parameters (i.e., the simulation cases), the method 420 characterizes the uncertainty of the model in the optimal outcomes. These optimal outcomes (for the given simulation cases) include the optimal feedstocks, respective feedstock volumes, and operating conditions with respect to each given simulation case. Note that the simulation cases may be solved in parallel because the different instances of the MINLP model are independent of one another.

In some embodiments, to simplify the interpretation of the solutions of the respective simulation cases, restrictions may be placed on the maximum number of feedstocks (e.g., crudes) that can be purchased in each simulation case (i.e., feed-slate size restrictions). In some of the embodiments, the feed-slate size restrictions may be implemented as mixed-integer constraints in the MINLP model. For example, the method 420 may define binary variables $b_i$ as a subset of the decision variables in vector y of the general MINLP model presented in Equations (1)-(3) in order to indicate whether or not to purchase feedstock i, as shown in Equation (4):

$$M_i b_i \geq x_i \forall i \in I \quad (4)$$

where $M_i$ is a large scalar that is greater than or equal to the upper bound of the purchase amount, $x_i$. Notice that the constraints in Equation (4) require that $b_i=1$ if the purchase amount $x_i>0$.

The method 420 may, then, use these binary variables (as shown in Equation (5)) to limit the feedstock procurement to no more than N feedstocks (e.g., crudes):

$$\sum_{i \in I} b_i \leq N \quad (5)$$

To allow for a reasonable amount of flexibility in the feedstock procurement process, the value of N should not be set too small (e.g., $N \geq 7$). In some embodiments, if more than 10% of the simulation cases are infeasible, the user is given the option (e.g., by process modeling system 100) to repeat this step with a different number of feedstocks for Equation (5). Note that Equations (4) and (5) would enter the MINLP model through Equations (2) and (3).

Next, in FIG. 5A, the method 420, at step 515, performs a probabilistic analysis of the different modeled outcomes from the simulation cases to select robust feedstocks (e.g., crudes) to procure on long-term contracts. Specifically, the method 420 generates a feed slate distribution (e.g., via Solution Analyzer 160 at user interface display 110 of system 100) by plotting the optimal feedstocks from the modeled outcomes of each simulation case. In other embodiments, the method 420, at step 515, may use other probabilistic distributions, or any other probabilistic means, to analyze the modeled outcomes of the simulation cases. The feed slate distribution indicates, over all of the simulation cases, the probability that each feedstock will appear/occur as an optimal feedstock in the modeled outcomes of the simulation cases. The method 420 applies a threshold probability to the probabilistic feed slate distribution to partition (classify) the distributed feedstocks in the feed slate distribution into a set of robust feedstocks, and a set of risky feedstocks. In the embodiment of FIG. 5A, the threshold is selected by the user (e.g., as a value provided to the Solution Analyzer 160 of process modeling system 100), and the method 420 performs a validation check to ensure that the value is not set so high as to exclude all available feedstocks present in the distribution. In other embodiments, the method 420 may automatically generate the threshold probability based on modeled conditions. Note, the partitioning of the feed slate distribution does not guarantee that procuring the classified robust feedstocks together in the same feed slate would be optimal, but, rather, is used in the method 420 as a reliable metric to eliminate the set of risky feedstocks from long-term contract considerations.

Figure 5B:
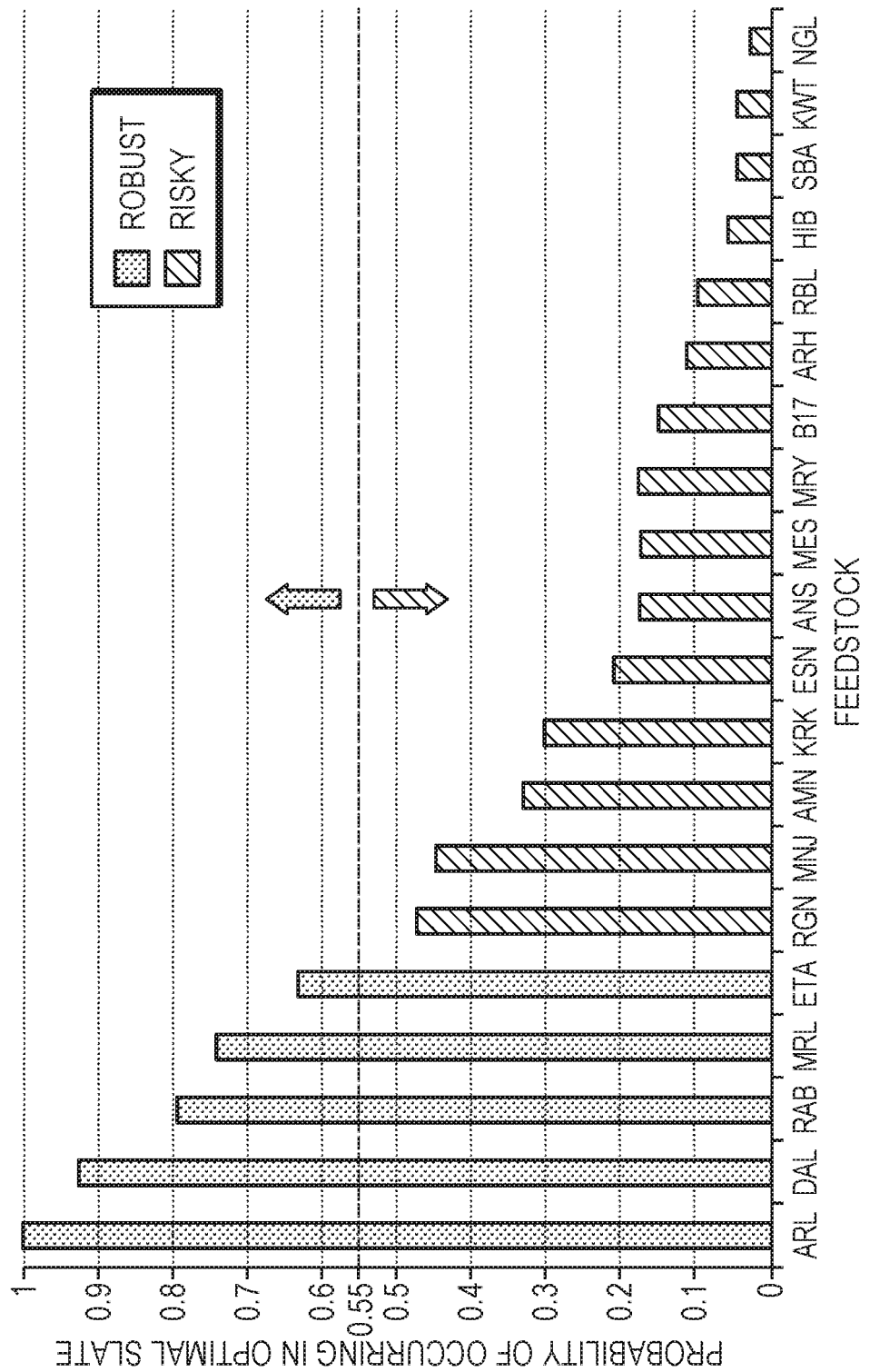
FIG. 5B is an example of a crude slate distribution generated by the method of FIG. 5A.

FIG. 5B is an example feed slate distribution (specifically, a crude slate distribution) of a set of feedstocks (i.e., crudes) generated by step 515 of FIG. 5A. FIG. 5B represents a bar graph with the probability of a crude occurring in an optimal slate on the y-axis and the different modeled feedstocks on the x-axis. The illustrated crude slate distribution was generated by plotting the number of times a given crude (e.g., SBA) appeared in the modeled outcomes as an optimal crude (i.e., part of an optimal slate) determined by the simulation cases described in reference to step 510 of FIG. 5A. For example, the crude slate distribution indicates a high probability of Arabian Light (ARL) crude occurring as an optimal feedstock in the modeled outcomes of the simulation cases. That is, ARL is shown in the crude slate distribution with a probability of approximately one-hundred percent of occurring in an optimal slate, and, as such, the crude slate distribution indicates that most of the modeled outcomes of the simulation cases selected ARL as an optimal crude for procurement, regardless of the respective realization values for the uncertain parameters. In FIG. 5B, a threshold probability of 55 percent is selected for partitioning the set of feedstocks (I) into robust feedstocks ($I_R$) and risky feedstocks ($I-I_R$). Note, in FIG. 5B, this threshold probability indicates that for a crude to be classified as a robust crude, the crude must be present in the optimal slate of the modeled outcomes of at least 55 percent of the simulation cases (otherwise the crude is characterized as a risky crude). By applying this threshold probability, five crudes (ARL, DAL, RAB, MRL, and ETA) are classified as robust crudes, and the remaining fifteen crudes are classified as risky crudes, for procurement on long-term contracts.

Continuing with FIG. 5A, step 520 of method 420, then, checks if at least one feedstock was characterized as a robust feedstock (e.g., robust crude) in step 515. If the method 420, at step 520, determines that none of the feedstocks were characterized as a robust feedstock, then the method 420 returns to step 515 to apply adjustments to the selection of robust feedstocks; otherwise, the method 420 proceeds to step 525. The method 420, at step 525, establishes an optimal feedstock volume to procure for each characterized robust feedstock. The modeled outcomes of the simulation cases, as determined in step 510, provide procurement (purchase) volumes for each feedstock included in the modeled outcome, including procurement volumes for each characterized robust feedstock, with respect to each individual simulation case. Note, in some embodiments, the amount of feedstock may be measured in other ways than volume, such as by weight and the like.

In an example scenario where a single feedstock i' is characterized as a robust feedstock at step 515, and approved in step 520, the procurement volumes for the single robust feedstock are retrieved from the modeled outcomes of the simulation cases and used as data points in an empirical cumulative distribution function (ECDF). In other embodiments, the method 420, at step 525, may use other probabilistic distributions, or any other probabilistic means, to analyze the modeled outcomes of the simulation cases. For a given volume, the ECDF indicates the probability that the single robust feedstock is purchased at or below this given volume. In the ECDF, the probability level (risk level) for purchasing a robust feedstock at or below a given volume increases by 1/m, where m is the number of data points, when moving from left to right on the displayed ECDF as presented (e.g., on user interface display 110 of system 100). That is, the number of modeled outcomes (i.e., data points) from the simulation cases that indicate purchasing the robust feedstock at or below the corresponding volume increases; thus, the corresponding purchase volumes become increasingly unlikely to be optimal.

As procuring (purchasing) conservative, robust feedstock volumes is most desirable in long-term contracts, the method 420, at step 525, uses a constraint of the form $x_i \leq \xi_{i'}$, where $\xi_{i'}$ is an uncertain upper bound on the purchase amount (volume) of the single feedstock i'. Note that this upper bound should not be exceeded, as greater volumes of robust feedstocks appear in fewer simulation cases and, thus, carry higher risk (as indicated in the ECDF). The possible realizations of are simply the purchase volumes obtained from the modeled outcomes of the simulation cases. This constraint need not hold for all possible values of $\xi_{i'}$, but only for a certain percentage of possible realizations such that the method 420 can establish a robust upper bound on the purchase volume. Specifically, this constraint should hold with a confidence level of $1-\alpha$, where $\alpha$ is the risk level; i.e., $$\mathbb{P}\{x_i \leq \xi_{i'}\} \geq 1-\alpha \qquad (6)$$

where $\mathbb{P}$ is the probability measure. This is what is known as an individual chance constraint, as described in Charnes, A., et al., "Chance-Constrained Programming," Management Science, 6 (1), pages 73-79 (1959), hereinafter referred to as "Charnes." These chance constraints can be reformulated in Equation (7), as described in Calfa:

$$x_i \leq F_{\xi_{i'}}^{-1}(\alpha) \qquad (7)$$

where $F_{\xi_{i'}}^{-1}(\cdot)$ is the inverse of the ECDF for uncertain parameter $\xi_{i'}$ (i.e., the quantile function of $\xi_{i'}$).

Note that this chance-constrained optimization (originally introduced by Charnes) used in the first stage of embodiments specifically relies on Calfa. Calfa considers a production-planning example in which the maximum output flow rates of two plants are uncertain, and the objective is to maximize the total expected profit of the overall operation. Calfa employs joint chance constraints (with the use of historical data for the maximum production capacities of the two plants) in order to specify robust values for the output flow rates. In Calfa, higher plant outputs may increase the total expected profit; however, the likelihood of achieving such outputs may be extremely unlikely. The joint chance constraints, as used by Calfa, allow for a solution that is based on safe, reasonable output flow rates, thereby hedging against the uncertainty in the operation. As such, the use of joint chance constraints in industrial planning problems is not new; however, no known approach applies these constraints to the problem of crude and petrochemical feedstock selection, with probability distribution data for the joint chance constraints obtained by simulation cases, where each simulation case comprises a non-linear optimization problem.

Figure 5C:
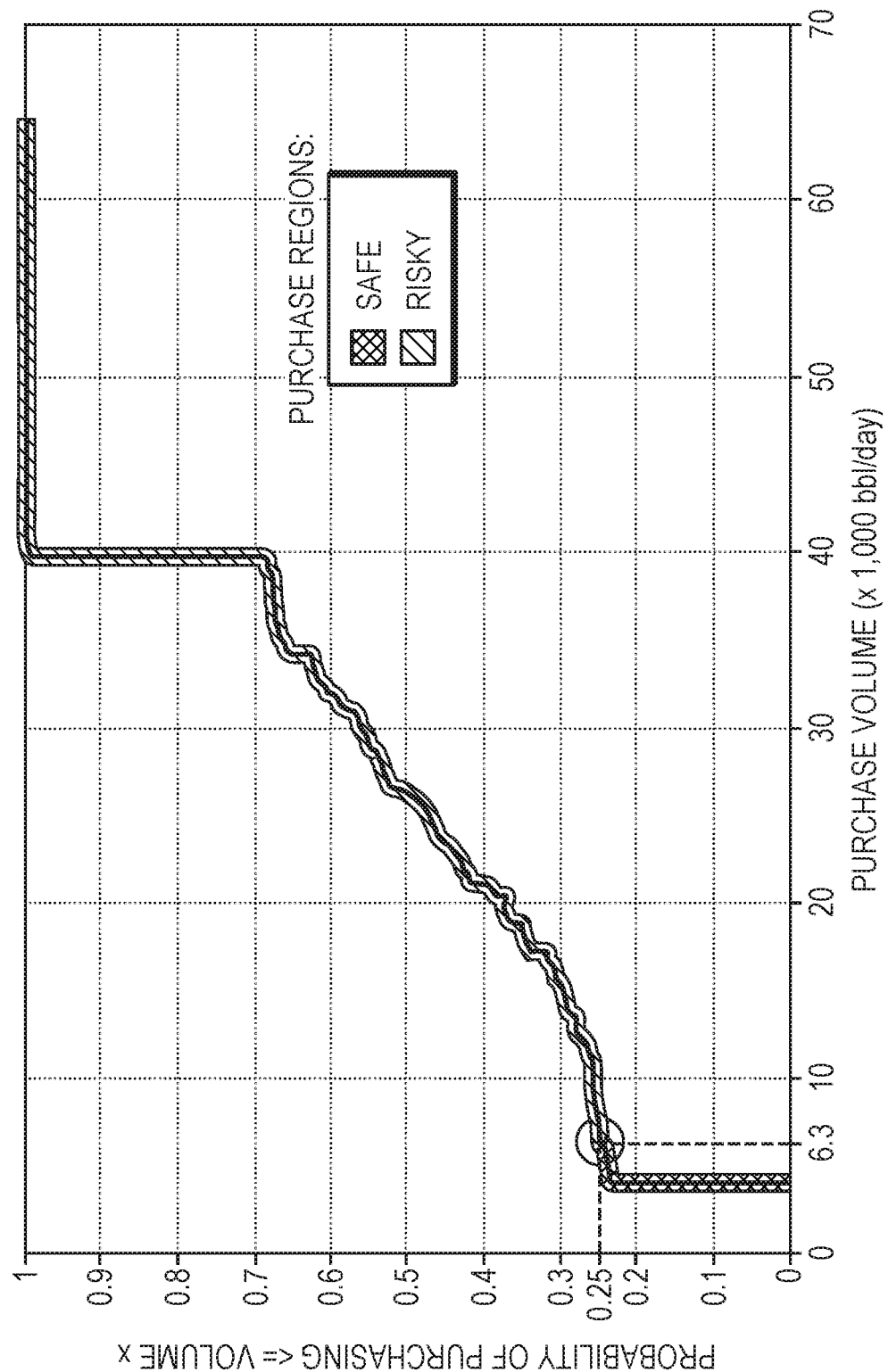
FIG. 5C is an empirical cumulative distribution function of feedstock purchase volumes generated in embodiments of the method of FIG. 5A.

FIG. 5C is an example empirical cumulative distribution function (ECDF), with an applied chance constraint, used for selecting the purchase volume of a single robust crude selected in step 515 of method 420 of FIG. 5A. FIG. 5C illustrates a graph of the ECDF with purchase volumes on the x-axis and the respective probability of purchasing the robust crude i' (i.e., the fraction of modeled outcomes from the simulation cases that indicate purchasing the robust feedstock at or below the corresponding volume) on the y-axis. For a given purchase volume, the corresponding probability on the y-axis can be interpreted as the risk level, $\alpha$. The ECDF curve is generated by plotting, as data points, in ascending order, the volumes of the robust crude i' that the modeled outcomes from the simulation cases indicate purchasing. For example, in FIG. 5C, the ECDF shows that about 30% of the modeled outcomes indicate purchasing 15,000 bbl/day or less of robust crude i' and, moving right on the ECDF, 70% of the modeled outcomes indicate purchasing 40,000 bbl/day or less of robust crude i'. As the ECDF is traversed from left to right, the percentage of modeled outcomes (i.e., data points) that indicate purchasing the robust crude i' at or below the corresponding volume increases; thus, the corresponding purchase volumes become increasingly unlikely to be optimal. FIG. 5C indicates the application of a 25% risk level (i.e., $\alpha=0.25$) to the ECDF, which results in a calculated upper bound of 6,300 bbl/day for the purchase volume. Note that this is a confidence level of 75%. As such, the corresponding chance constraint restricts the purchase volume to the safe purchase region below the 25% probability of purchase; specifically, to the region on the left of the x-axis, $x_{i'} \leq 6.3$ kbbl/day, which implies that $x_{i'}$ must be less than or equal to 75% of the possible realizations of $\xi_{i'}$.

In practice, feedstock procurement decisions are unlikely to involve a single robust feedstock i', but instead multiple robust feedstocks $i \in I_R$. The method 420, at step 525, may not use individual chance constraints when there are multiple robust feedstocks being evaluated, as the data-generating process is an optimization problem and the procurement volumes originate from the same instances of that problem (i.e., simulation cases). As such, these procurement volumes are linked to each other, and step 525 must consider the robust portion of the feedstock slate as a whole. Step 525 of method 420 instead uses a joint probability distribution (as opposed to the univariate distribution used for probabilistic analysis of a single robust feedstock), as described in Calfa.

Joint chance constraints for the robust feedstocks are given, in Equation (8), by:

$$\mathbb{P}\{x_i \leq \xi_i \forall i \in I_R\} \geq 1-\alpha \qquad (8)$$

Equation (8) requires that the constraints hold jointly with at least a confidence level $1-\alpha$.

Another consequence of using an optimization problem as the data-generating process is that the method 420, at step 525, has no advance knowledge of the purchase-volume distribution, and there is also no guarantee that the data will follow a known distribution. To circumvent this issue, the method 420, at step 525, estimates probability distribution $\mathbb{P}$ as $\hat{\mathbb{P}}$ using kernel density estimation (KDE) in Equation (9), as described in Calfa:

$$\frac{1}{m}\sum_{j=1}^{m}\prod_{i \in I_R}\left[1 - K_i\left(\frac{x_i - \xi_{i,j}}{h_i}\right)\right] \geq 1 - \alpha'_+ \qquad (9)$$

In Equation (9), $K_i$ is the integrated kernel corresponding to the sample data for feedstock i, $h_i$ is the associated bandwidth, and $\alpha'_+$ is the decreased risk level from the estimation process. The estimation of the distribution involves taking the product of all kernels for each data point j, and then taking the weighted sum over all of these products. The method 420, at step 525, uses a second-order Gaussian kernel due to its convenient mathematical properties. Note that this constraint is non-linear.

The method 420, at step 530, then generates a robust base case of the MINLP model that includes the joint chance constraints from step 525 (Equation (9)). To ensure that the determined volumes of the robust feedstocks for procurement on long-term contracts sum to the desired feed slate volume (e.g., 60% of capacity), step 530 of method 420 further includes the following equality constraint (i.e., capacity-fulfillment constraint) in the robust base case:

$$\sum_{i \in I_R} x_i = \rho_R C \quad (10)$$

where $\rho_R$ is the fraction of the capacity desired to be reserved for feedstocks on long-term contracts, and C is the available processing capacity of the refinery or plant.

The introduction of the constraints from Equations (9) and (10) into the MINLP model enables the modeling of long-term contract requirements with conservative procurement volumes, thereby providing an operating point more resilient to changes in the uncertain input parameters. Note that the desired processing capacity of Equation (10) may be impossible to satisfy in certain special cases. For example, this may occur when too few robust feedstocks are selected in step 515 (i.e., application of an unreasonably high threshold probability), or when the procurement limits defined by the joint chance constraints are too low (i.e., application of an unreasonably high confidence limit in step 525). Accordingly, if the model is infeasible, then method 420, at step 535, returns to step 515 to select robust feedstocks based on an updated threshold probability. Otherwise, the method 420, at step 530, solves the robust base case to obtain a single, robust set of decisions for the long-term contract procurements (purchases). Note, in solving the robust base case, the method 420, at step 530, is primarily concerned with only the purchase volumes of the robust feedstocks. In some embodiments, the method 420 may repeat steps 525 and 530 with different values of a to evaluate the tradeoff in solution quality for varying levels of risk.

Figure 5D:
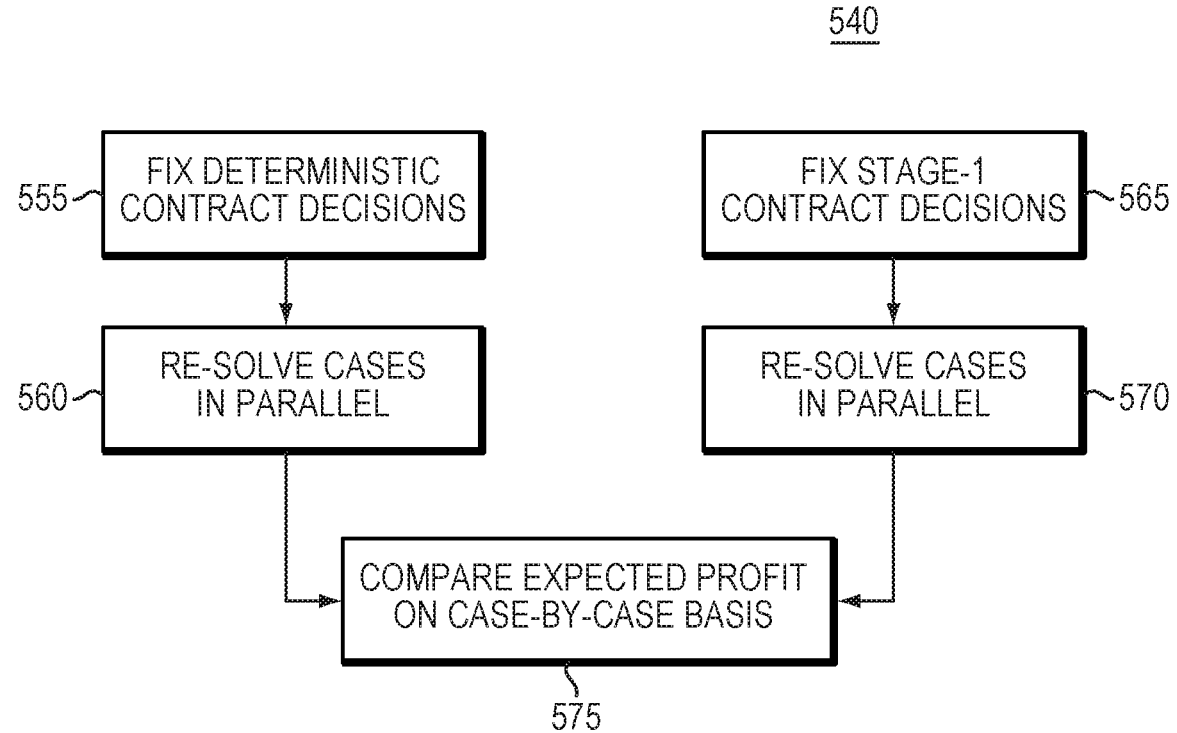
FIG. 5D is an example method for validating the results from the method of FIG. 5A.

In the embodiment of FIG. 5A, at step 540, the method 420 then validates the set of long-term contract decisions from the robust base case. FIG. 5D is an example method 540 for validating the set of long-term contract decisions from step 530 of FIG. 5A. To validate these decisions, the method 540 compares the method 420 for Stage 1 against a deterministic approach (where the deterministic approach consists of solving a single problem instance using expected values for all of the uncertain parameters). The method 540, at step 565, first fixes the long-term contract decisions from the robust base case (step 530 of method 420 in FIG. 5A) in the simulation cases of step 505 of method 420, to create one set of simulation cases for validation. The method 540, at step 555, similarly fixes contract decisions provided by a deterministic approach (using the original MINLP model) in the simulation cases of step 505 of method 420, to create another set of simulation cases for validation. The method 540, at steps 560 and 570, repeats step 510 of method 420 to solve both sets of simulation cases in parallel.

The inclusion of the fixed long-term contract decisions in the simulation cases simulates the reality of the long-term contract procurement decisions of Stage 1, thus, causing the remaining feedstock procurement decisions and operation decisions to be made in the presence of the respective uncertainty with these long-term contract decisions fixed.

That is, the method 540 evaluates the robustness of the decisions from step 530 (i.e., Stage 1) against different realizations for the uncertain input parameters in the MINLP model. The method 540 further evaluates the robustness of the Stage-1 decisions by comparing the respective simulation cases to those of a deterministic approach, wherein the deterministic approach arbitrarily fixes the contract decisions based solely on the solution from a single deterministic base case of the MINLP model. Note that the deterministic contract decisions are considered to be fixed "arbitrarily" because there is no statistical information available for the deterministic approach. The simulation cases for the deterministic approach serve the same purpose as described for Stage 1, except the deterministic simulation cases evaluate the robustness of a deterministic long-term contract procurement strategy. The method 540, at step 575, further compares the expected profit from the modeled outcomes of the two competing approaches on a case-by-case basis. Specifically, the method 540 calculates the difference between the profit resulting from the long-term contract procurement decisions from the Stage 1 approach and the profit from the deterministic approach, and then computes the mean of this quantity over all simulation cases.

Figure 5E:
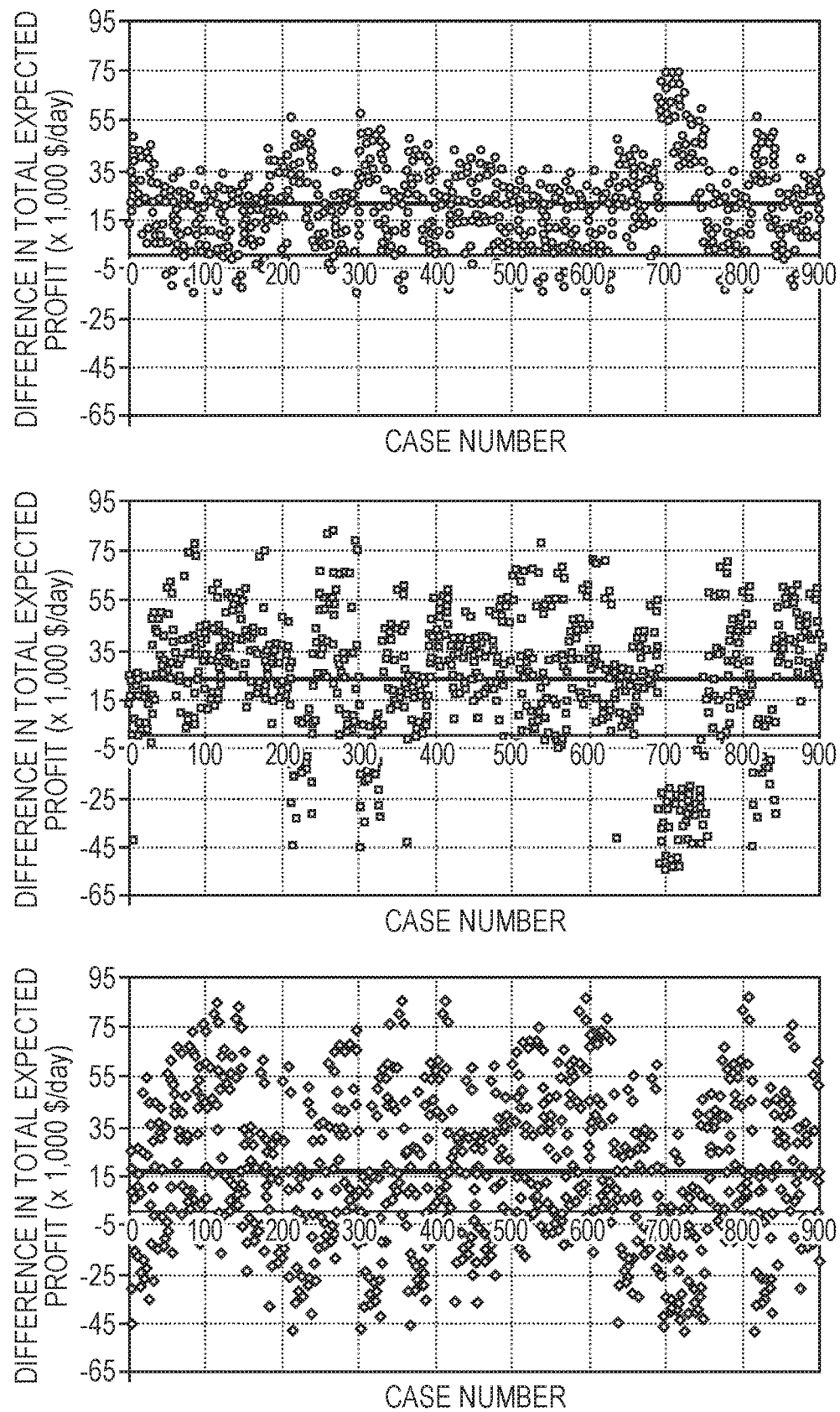
FIG. 5E is a plot of differences in expected profits between using a deterministic decision making strategy for feedstock selection versus the method of FIG. 5A.

FIG. 5E illustrates the difference in total expected profit between the procurement decisions made by the Stage 1 approach of method 420 and the procurement decisions made by three different deterministic approaches. Each graph indicates the difference in total expected profit between each simulation case of method 420 and the respective simulation case of the deterministic approach on the y-axis and the simulation case number on the x-axis. Specifically, FIG. 5E plots the difference in total expected profit in three different graphs for a refinery planning problem with product-price uncertainty. The plots include 901 different simulation cases, and, as shown, the majority of the data points lie above the x-axis, indicating a positive improvement in the profit due to the Stage 1 decisions. The solid horizontal line in each plot represents the mean ($21,000/day, $21,000/day, and $16,000/day, respectively). In these example comparisons, the use of the Stage-1 method leads to an improvement that is approximately 1% of the profit of the respective deterministic base case, which is a significant improvement. As such, these numerical results indicate that this strategy provides significant economic benefits and far outperforms the deterministic approach, leading to a considerable increase in profit.

Stage 2 of Example Feedstock Procurement Method

Figure 6A:
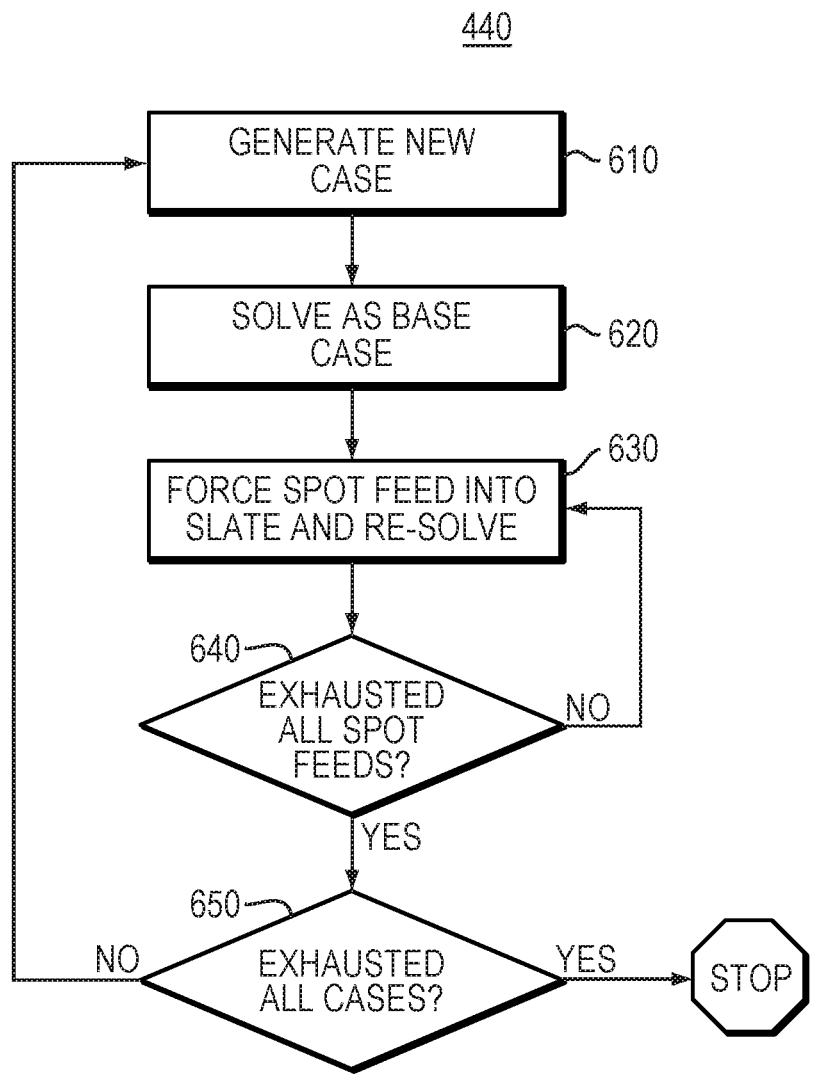
FIG. 6A is a flowchart of a detailed depiction of Stage 2 of the method of FIG. 4.

FIG. 6A is a flowchart of a detailed depiction of Stage 2 of the method 440 of FIG. 4. In Stage 2 (i.e., the tactical decision stage), method 440 determines a set of robust feedstocks to procure in the spot market. In some embodiments, the method 440 may be executed as part of a process modeling system 100 (e.g., ASPEN PIMS) as shown in FIG. 1A. The method 440 (FIG. 6A) begins at step 610 by generating new simulation cases (e.g., via Modeler Engine 140 of system 100) for determining probabilistic information regarding feedstock procurement in the spot market. The new generated simulation cases are different instances of the MINLP model, as in method 420 for Stage 1, with different uncertain input parameters that instead represent uncertainty related to selecting feedstocks to procure in the spot market. That is, as the method 440 evaluates Stage 2 on a shorter timescale than method 420 evaluates Stage 1, there are different sources of uncertainty that are present in the tactical planning of Stage 2 than are present in the higher-level, strategic planning of Stage 1. The types of uncertainties present in Stage 2 include operating condition uncertainties (e.g., equipment availability) and other uncertainties (e.g., assay quality) that are highly relevant from the tactical perspective of Stage 2. There may also be existing uncertain input parameters from Stage 1 for which the uncertainty has not yet been resolved, and updated data for these parameters may be available, and included in the simulation cases, for Stage 2.

Continuing with FIG. 6A, at step 610, method 440 generates the new simulation cases, with new user-provided or system-provided realization data for the new uncertain input parameters (e.g., via user interface 110 of system 100), in the same manner as previously described in step 505 of method 420 (FIG. 5A). However, in some embodiments for non-pipeline refineries or petrochemical plants, method 440 may include cargo-size constraints in the new simulation cases. The cargo-size constraints are included in these embodiments because, for non-pipeline refineries or petrochemical plants, feedstocks can typically only be purchased at certain volume tiers based on the capacity of a cargo ship, such as in increments of 300,000 barrels (e.g., to satisfy processing requirements of 10,000 bbl/day for one month). The method may enforce this cargo-size restriction with integer constraints, as shown in Equation (11):

$$x_i = \frac{\beta_i}{30} y_i \forall i \in I_S \tag{11}$$

where $$\frac{\beta_i}{30}$$

represents a snip s capacity in barrels/day for one month's supply of feedstock i; $y_i$ is the number of ships required to satisfy the purchase amount of feedstock i; and set $I_S$ is the set of all spot feedstocks.

The method 440, at step 620, solves a first single simulation case of the generated simulation cases as a base case. That is, unlike step 510 of method 420 (in FIG. 5A), where all of the simulation cases are solved in parallel, step 620 of method 440 (FIG. 6A) solves only a single simulation case at a time as a base case in the method 440. The method 440, at step 620, solves the single simulation case with only the selected robust feedstocks for procurement on long-term contracts (i.e., contract feedstocks) determined in step 530 of method 420 (FIG. 5A). This single simulation case serves as a base case of the method 440, and the method 440, at step 620, stores the optimal objective function value from this base case. The method 440, at step 630, then, forces a fixed procurement volume of an available spot feedstock i (e.g., 20,000 bbl/day of a crude as available from the spot market) into the base case of step 620, with zero price, and re-solves this new base case (i.e., a feedstock case) with the addition of the spot feedstock i. Note, if an available spot feedstock is the same as a feedstock already procured on a long-term contract, the method 440, at step 630, defines new variables and constraints for that feedstock in the model (i.e., in all new simulation cases). As the refinery or plant capacity is now partially satisfied by the spot feedstock i with zero price, the optimal objective function value increases. The method 440, at step 630, then, takes the difference between the objective function value of the feedstock case and the objective function value stored in step 620 for the base case, and divides by the daily volume of the spot feedstock i to find the feedstock indifference value (i.e., breakeven price). This value, in general form, is given by Equation (12):

$$FIV_{i,k} := \frac{Z_{i,k}^{new} - Z_k^{base}}{x_i} \forall i \in I_S, \tag{30}$$

$$k \in K$$

where, for base case k, $Z_k^{base}$ is the optimal objective function value of the base case, $Z_{i,k}^{new}$ is the optimal objective function value of the feedstock case, and $x_i$ is the daily volume of spot feedstock i.

The method 440, at step 640, checks if there is a next spot feedstock in the set of available spot feedstocks, $I_S$. If there is a next available spot feedstock (i.e., all spot feedstocks are not exhausted), the method 440 repeats step 630 using the same base case (with only the contract feedstocks from step 530 of method 420) and the next available spot feedstock $i \in I_S$ at the same procurement volume. Note, the new feedstock cases generated for each spot feedstock $i \in I_S$ are independent, and, as such, method 440 may solve each of these feedstock cases (using step 630) in parallel. If method 440, at step 640, determines that there is not a next available spot feedstock, the method 440 continues to step 650. At step 650, the method 440 checks if there is a next simulation case to be evaluated (as a next base case) for the set of feedstocks $I_S$. If there is a next simulation case (i.e., all cases are not exhausted), the method 440 returns to step 610, and repeats the method 440 for each spot feedstock $i \in I_S$ in relation to the next simulation case.

The indifference value, $FIV_{i,k}$, (i.e., breakeven price) calculated for each spot feedstock i with respect to each simulation case k, indicates the ability of spot feedstock i to displace a certain volume of the contract feedstocks of case k. Note, this price is specific to a particular plant/refinery's operations. Generally speaking, spot feedstock i is a good purchase if it can be purchased from the spot market at or below this price, $FIV_{i,k}$ (i.e., the breakeven price). Note, the method 440 calculates the FIV for multiple simulation cases, with varied realization values for the uncertain input parameters because, at the time of feedstock planning, the uncertainty in the operation conditions and other conditions is not yet resolved. For each spot feedstock $i \in I_S$, the method 440 uses the breakeven prices to generate an empirical cumulative distribution function (ECDF) that provides a probabilistic overview for breakeven analysis. Note, the plotted ECDFs are univariate ECDFs, as each breakeven price is computed from a separate optimization problem (i.e., base simulation case). By means of these ECDFs, the method 440 further provides a risk level α (or confidence level 1−α) for each breakeven price. The desired risk level α (or confidence level 1−α) may be selected for the breakeven prices by a user or a system executing method 440 (e.g., via user interface display 100 of system 100).

Further, note that breakeven analysis, although a common practice in industry, has been included in few published works, such as the short articles by Cretien, P. D., "*Trading option break-even prices*," Futures magazine," http://www-.futuresmag.com/2011/08/31/trading-option-break-even-prices (2011), which discusses breakeven prices from a financial perspective. Such articles simply discuss breakeven prices in the context of current market conditions and do not offer any new algorithmic insights. Typically, a breakeven analysis is performed for a single operating point; however, to allow for robust, tactical decision-making, method 440 instead uses a probabilistic breakeven analysis to account for uncertainty in the operations and provides the user with breakeven prices for any chosen risk level (or confidence level).

Figure 6B:
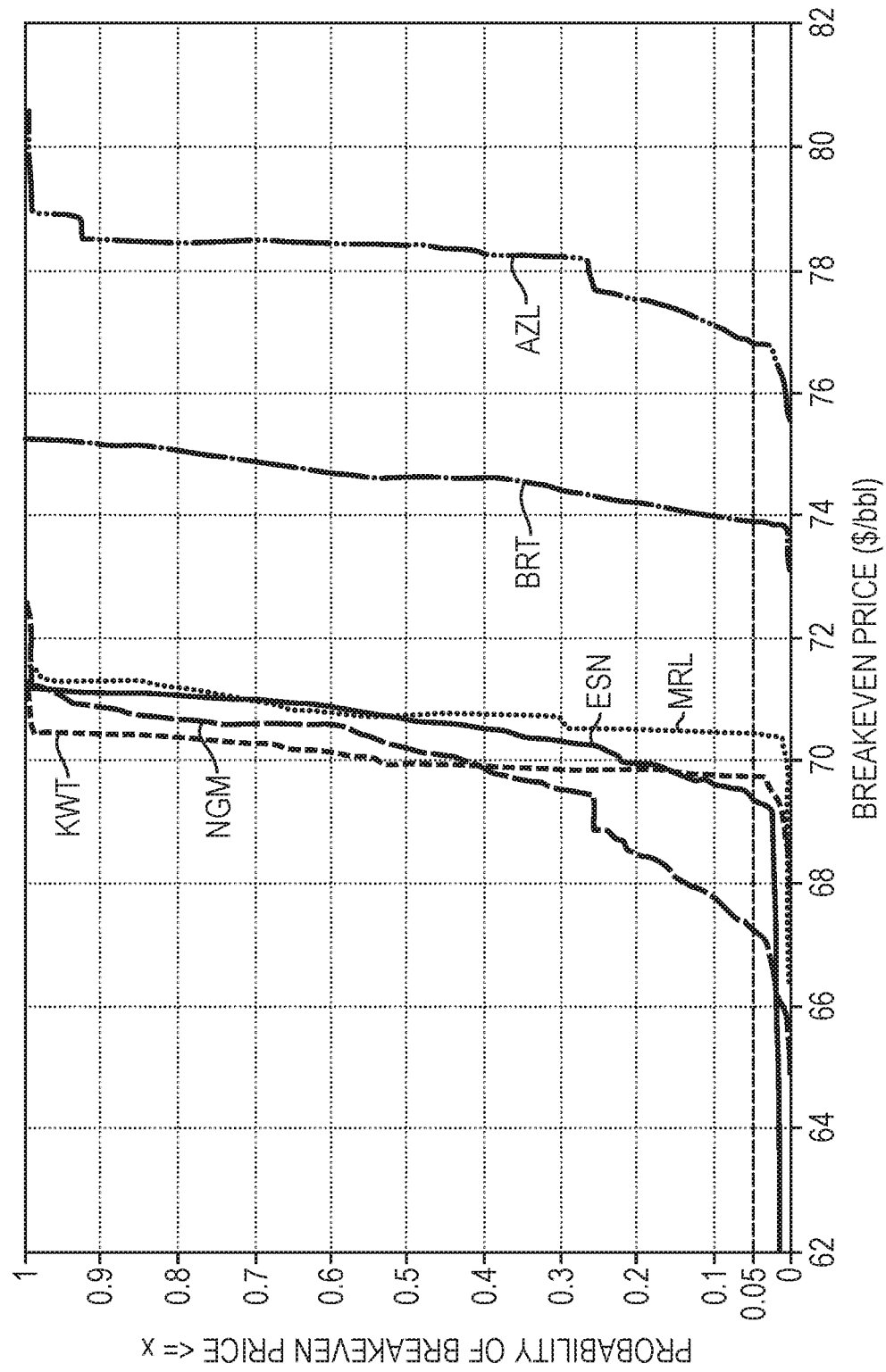
FIG. 6B is a graph of a probabilistic breakeven analysis generated from the data obtained by the method of FIG. 6A.

FIG. 6B is an example probabilistic breakeven analysis of a refinery planning problem, with equipment availability uncertainty, used to select spot feedstocks to procure in the spot market (Stage 2). Specifically, FIG. 6B illustrates a graph with breakeven prices ($/bbl) on the x-axis and the respective probability of the breakeven price being at or below the respective price (i.e., the corresponding risk level, a) on the y-axis. The ECDF curves shown in FIG. 6B plot the indifference values (i.e., breakeven prices) determined from generating and solving 499 simulation cases for each of 6 spot feedstocks (AZL, ESN, NGM, BRT, KWT, and MRL), in accordance with steps 610-650 of method 440. A given ECDF curve plots each determined breakeven price for a given spot feedstock in relation to a risk level (or confidence level). For example, the ECDF curve for KWT indicates a breakeven price of $69.74 for KWT at a 5% risk level (i.e., $\alpha=0.05$), and the ECDF curve for AZL indicates a breakeven price of $76.82 for AZL at the same risk level of 5%. Note that this is a confidence level of 95%. As such, if a user (e.g., trader) would like to procure KWT or AZL such that this decision is profitable in 95% of cases, the trader would need to pay less than the breakeven prices of $69.74 and $76.82, respectively.

The method 440, then, defines the incremental profit value (IPV) for each analyzed spot feedstock as the difference between the breakeven price (FIV) and the current market price, $p_i^{market}$, as shown in Equation (13):

$$IPV_{i,k} := FIV_{i,k} - p_i^{market} \forall i \in I_S, k \in K \tag{13}$$

For a specific breakeven price, the incremental profit value indicates the intrinsic value of each analyzed spot feedstock under the current price conditions. The method 440 uses the IPV to objectively rank the spot feedstocks in descending order of purchase priority (i.e., as an objective pecking order) for procurement in the spot market. In other embodiments, the IPV may be used to objectively order the spot feedstocks in any other manner. Note that the entire method 440 may be repeated with different fixed procurement volumes for spot feedstocks $i \in I_S$, which may yield different breakeven prices for analysis.

FIGS. 1C-I and 1C-II (together) illustrate a spreadsheet of sample data for a process unit model, which may be provided to a trader in some example embodiments of the present invention for procuring the feedstocks on long-term contracts, in Stage 1, or procuring feedstocks in the spot market, in Stage 2, and specifying the corresponding operation conditions for processing the procured feedstocks.

Digital Processing Environment

Figure 7:
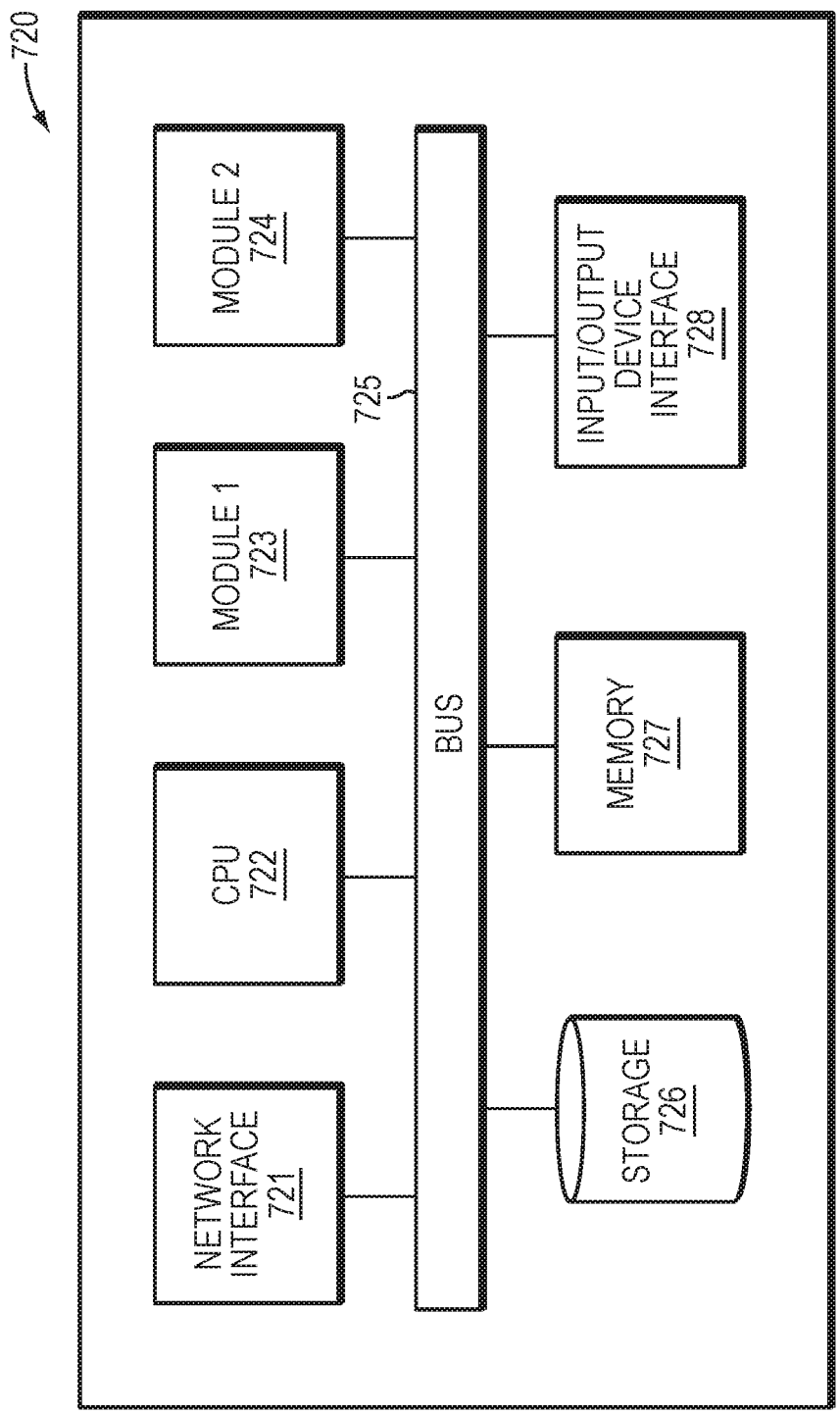
FIG. 7 is a block diagram of a computer (or digital processing) system for performing robust feedstock selection in at least one embodiment of the present invention.

FIG. 7 is a simplified block diagram of a computer-based system 720 that may be used for robust feedstock selection planning for an industrial process according to an embodiment of the present invention. The system 720 comprises a bus 725. The bus 725 serves as an interconnector between the various components of the system 720. Connected to the bus 725 is an input/output device interface 728 for connecting various input and output devices such as a keyboard, mouse, display, touch screen overlay, speakers, camera, sensor feeds, controllers, etc. to the system 720. A central processing unit (CPU) 722 is connected to the bus 725 and provides for the execution of computer instructions. Memory 727 provides volatile storage for data used for carrying out computer instructions. Storage 726 provides non-volatile storage for software instructions, such as an operating system (not shown). In particular, memory 727 and/or storage 726 are configured with program instructions implementing methods and/or modules 140, 150, 160, 400, 420, 540, and 440 for providing robust feedstock selection, as detailed in FIGS. 1A, 4, 5A, 5D, and 6A, respectively. The system 720 also comprises a network interface 721 for connecting to any variety of networks known in the art, including cloud, wide area networks (WANs) and local area networks (LANs).

Further connected to the bus 725 is a first module 723. The first module 723 is configured to generate simulation cases of a mixed-integer, non-linear optimization problem (MINLP) model. The first module 723 may generate the simulation cases through any means known in the art. This module may retrieve uncertain input parameter data that is stored on the storage device 726 or memory 727. Further, the first module 723 may load the uncertain input parameter data from any point communicatively coupled to the system 720 via the network interface 721 and/or input/output device interface 728.

The system 720 further comprises a second module 724 that is communicatively/operatively coupled to the first module 723. The second module 724 is configured to solve the generated simulation cases. The second module 724 may solve the simulation cases through any means known in the art. For example, this module may compute optimal feedstocks and feedstock volumes at the CPU 722 via the bus 725. The second module 724 may retrieve the simulation cases from the storage device 726 or memory 727. Further, the second module 724 may receive process variable data from any point communicatively coupled to the system 720 via the network interface 721.

It should be understood that the example embodiments described herein may be implemented in many different ways. In some instances, the various methods, systems, and devices described herein may each be implemented by a physical, virtual, or hybrid general purpose computer, such as the computer system 100 of FIG. 1A. The computer system 720 may be transformed into the machines that execute the methods described herein, for example, by loading software instructions into either memory 727 or non-volatile storage 726 for execution by the CPU 722. Further, while the first module 723 and second module 724 are shown as separate modules, in an example embodiment these modules may be implemented using a variety of configurations.

The system 720 and its various components may be configured to carry out any embodiments of the present invention described herein. For example, the system 720 may be configured to carry out or implement the modules 140, 150, 160 and/or methods 400, 420, 540, and 440 described hereinabove in relation to FIGS. 1A, 4, 5A, 5D, and 6A, respectively. In an example embodiment, the first module 723 and second module 724 may be implemented in software that is stored in the memory 727 and/or storage device 726. In such an example embodiment, the CPU 722 and the memory 727 with computer code instructions stored on the memory 727 and/or storage device 726 implement a first module that generates simulation cases of an MINLP model. Further, the components of the system 720 implement a second module that is operatively coupled to the first module and configured to solve the generated simulation cases.

Figure 8:
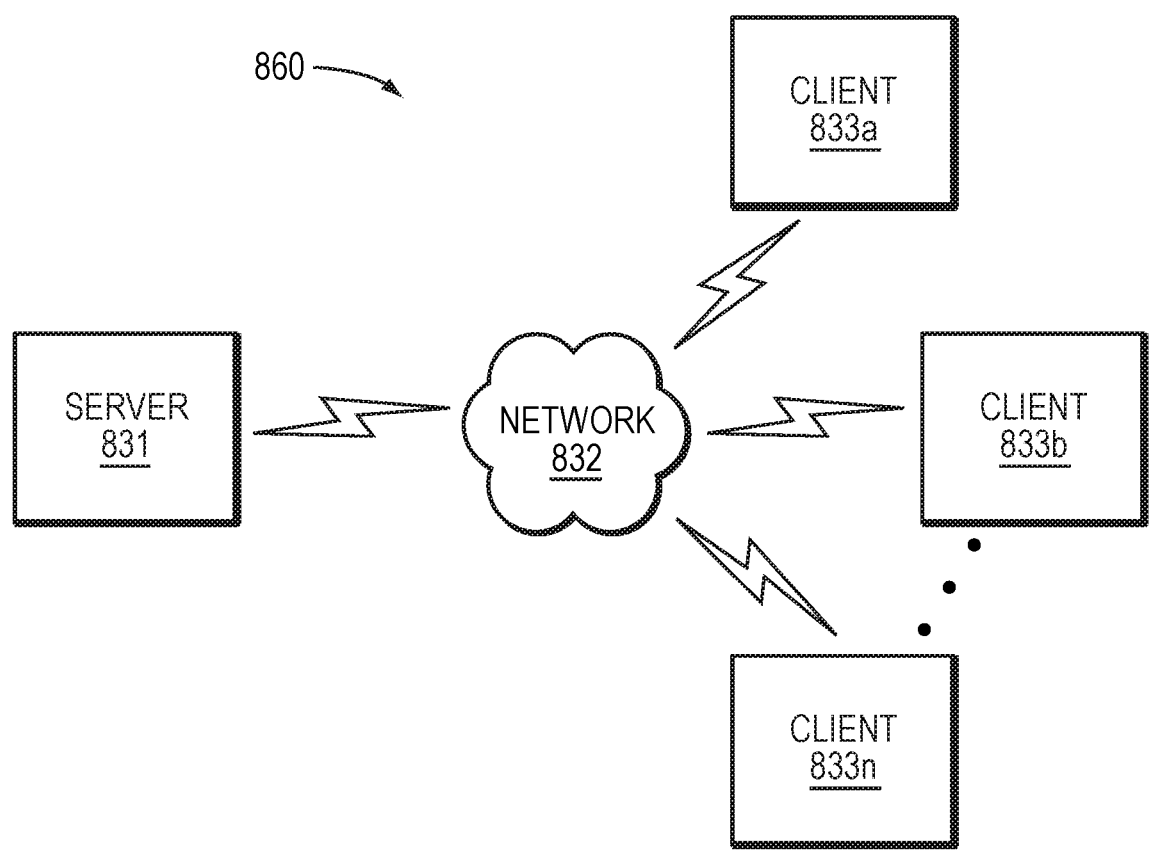
FIG. 8 is a schematic diagram of an example computer network environment in which embodiments of the present invention may be implemented.

FIG. 8 illustrates a computer network environment 860 in which an embodiment of the present invention may be implemented. In the computer network environment 860, the server 831 is linked through the communications network 832 to the clients 833a-n. The environment 860 may be used to allow the clients 833a-n, alone or in combination with server 831 to execute any of the modules and/or methods described hereinabove (e.g., modules 140, 150, 160 and/or methods 400, 420, 540, and 440 of FIGS. 1A, 4, 5A, 5D, and 6A, respectively). The environment 860 may comprise the process modeling system 100 (e.g., PIMS-AO) of FIG. 1A, or the refinery or plant operations of FIG. 2. It should be understood that the example embodiments described above may be implemented in many different ways. In some instances, the various methods and machines described herein may each be implemented by a physical, virtual, or hybrid general purpose computer, or a computer network environment such as the computer environment 860.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims. For example, refineries, manufacturing plants, and other industrial plants are included in the application areas of the present invention. The foregoing description is given with respect to processing plants for simplicity and clarity.

What is claimed is:

1. A computer-implemented method for programming operations of a subject industrial plant based on feedstock selection planning, the method comprising:
    a) evaluating a first stage and a second stage at separate time intervals throughout a feedstock selection planning process of the subject industrial plant;
    b) determining, in the evaluation of the first stage, a set of robust feedstocks to procure on long-term contracts, wherein the determining includes:
        modeling feedstock procurement on long-term contracts as a first set of simulation cases of a non-linear model, wherein the first set of simulation cases includes a set of uncertain input parameters representing risks or uncertainties at a first time interval, including risk or uncertainties in operation conditions of the industrial plant;
        solving each simulation case of the first set of simulation cases, in parallel, to model different feedstock selection outcomes, wherein the modeled outcomes include optimal feedstocks, feedstock volumes, and operation conditions with respect to the given simulation case; and
        performing probabilistic analysis of the different modeled outcomes from the first set of simulation cases to determine the set of robust feedstocks to procure on long-term contracts;
    c) determining, in the evaluation of the second stage, a set of robust feedstocks to procure in a spot market, wherein the determining includes:
        modeling feedstock procurement in the spot market as a second set of simulation cases of the non-linear model, wherein the second set of simulation cases includes a set of uncertain input parameters representing uncertainty related to selecting feedstocks to procure in the spot market at a second time interval and further includes the determined set of robust feedstocks from the first stage;
        solving each simulation case of the second set of simulation cases to model different breakeven prices for one or more spot feedstocks; and
        performing probabilistic analysis on the different breakeven prices for each of the one or more spot feedstocks, wherein the performing determining which of the one or more spot feedstocks to procure in the spot market;
    d) determining optimal operating conditions to process the determined robust feedstocks from each stage in order to produce a set of products; and
    e) providing to a control system of the subject industrial plant the determined set of robust feedstocks and the optimal operating conditions to program the subject industrial plant operations.

2. The method of claim 1, wherein the non-linear model is a mixed-integer, non-linear optimization problem (MINLP) model, and each simulation case comprises an independent instance of the MINLP model with a different set of realization values provided for the respective set of uncertain input parameters.

3. The method of claim 1, wherein the simulation cases are generated by: (i) fitting a multivariate distribution to the uncertain input parameter data using kernel density estimation (KDE), or capturing correlations among the uncertain input parameters using a copula-based approach, and (ii) applying Monte-Carlo sampling to the respective multivariate distribution or the captured correlations.

4. The method of claim 1, wherein the uncertain input parameters represent one or more of uncertain market conditions, uncertain operation conditions, and other uncertain industrial conditions.

5. The method of claim 1, wherein performing probabilistic analysis of the different modeled outcomes further comprises:
    selecting robust feedstocks from the optimal feedstocks of the different modeled outcomes:
        generating a probabilistic feed slate distribution from the optimal feedstocks of the different modeled outcomes; and applying a threshold probability to the probabilistic feed slate distribution to select one or more robust feedstocks from the distributed feedstocks; and establishing an optimal feedstock volume for each selected robust feedstock by:
generating a probabilistic distribution of feedstock volumes provided from the different modeled outcomes for the given robust feedstocks, and
applying joint chance constraints derived from the probabilistic distribution of the feedstock volumes to establish optimal feedstock procurement volumes for the given robust feedstocks.

6. The method of claim 5, wherein performing probabilistic analysis of the different modeled outcomes further comprises:
generating a robust base case of the non-linear model, the robust base case being generated to include the joint chance constraints and a capacity-fulfillment constraint; and
solving the generated robust base case, the solving determining the optimal procurement volumes corresponding to the set of robust feedstocks to procure on long-term contracts.

7. The method of claim 1, wherein the determined robust feedstocks to procure on long-term contracts are validated by: comparing expected profits from the determined set of robust feedstocks from the first stage against expected profits from a deterministic approach.

8. The method of claim 1, wherein solving each simulation case of the second set of simulation cases further comprises:
for each simulation case of the second set of simulation cases:
solving the given simulation case with the determined set of robust feedstocks from the first stage, the solving determining an optimal value of an objective function for the given simulation case; and
for each spot feedstock of a set of available spot feedstocks:
generating a feedstock case by forcing a fixed procurement volume of the given spot feedstock into the given simulation case,
solving the feedstock case to determine an optimal value of an objective function for the given feedstock case, and
calculating a breakeven price for the given spot feedstock based on: (i) the determined optimal objective function value for the given simulation case, and (ii) the determined optimal objective function value for the given feedstock case.

9. The method of claim 8, wherein performing probabilistic analysis on the different breakeven prices for each spot feedstock of a set of available spot feedstocks, further comprises:
generating ECDFs for breakeven analysis, each ECDF representing, for each spot feedstock, a correspondence between a calculated breakeven price and a risk level; and
ranking each spot feedstock of the set of available spot feedstocks for breakeven analysis, the ranking determined by defining an incremental profit value between a market value and each calculated breakeven price for the given spot feedstock; and
based on the ECDFs and the ranking, determining the set of robust feedstocks to procure in the spot market.

10. A computer system for programming operations of a subject industrial plant based on feedstock selection planning, the system comprising:
one or more processors and associated memory, the one or more processors configured to evaluate a first stage and a second stage at separate time intervals throughout a feedstock selection planning process of the subject industrial plant, the one or more processors determining, in the evaluation of the first stage, a set of robust feedstocks to procure on long-term contracts, wherein the one or more processors comprise:
a modeler engine configured to model feedstock procurement on long-term contracts as a first set of simulation cases of a non-linear model, wherein the first set of simulation cases includes a set of uncertain input parameters representing risks or uncertainties at a first time interval, including risk or uncertainties in operation conditions of the industrial plant;
a solver engine configured to solve each simulation case of the first set of simulation cases, in parallel, to model different feedstock selection outcomes, wherein the modeled outcomes include optimal feedstocks, feedstock volumes, and operation conditions with respect to the given simulation case; and
a solution analyzer configured to perform probabilistic analysis of the different modeled outcomes from the first set of simulation cases to determine the set of robust feedstocks to procure on long-term contracts;
the one or more processors being further configured to determine, in evaluation of the second stage, a set of robust feedstocks to procure in the spot market, wherein:
the modeler engine is configured to model feedstock procurement in a spot market as a second set of simulation cases of the non-linear model, wherein the second set of simulation cases includes a set of uncertain input parameters representing uncertainty related to selecting feedstocks to procure in the spot market at a second time interval and further includes the determined set of robust feedstocks from the first stage;
the solver engine is configured to solve each simulation case of the second set of simulation cases to model different breakeven prices for one or more spot feedstocks; and
the solution analyzer is configured to perform probabilistic analysis on the different breakeven prices for each of the one or more spot feedstocks, wherein the performing determining which of the one or more spot feedstocks to procure in the spot market; and
the one or more processors being further configured to determine optimal operating conditions to process the determined robust feedstocks from each stage in order to produce a set of products;
the solution analyzer providing to a control system of the subject industrial plant the determined set of robust feedstocks and the optimal operating conditions to program the subject industrial plant operations.

11. The system of claim 10, wherein the non-linear model is a mixed-integer, non-linear optimization problem (MINLP) model, and each simulation case comprises an independent instance of the MINLP model with a different set of realization values provided for the respective set of uncertain input parameters.

12. The system of claim 10, wherein the modeler engine is further configured to generate the simulation cases by: (i)

fitting a multivariate distribution to the uncertain input parameter data using kernel density estimation (KDE), or capturing correlations among the uncertain input parameters using a copula-based approach, and (ii) applying Monte-Carlo sampling to the respective multivariate distribution or the captured correlations.

13. The system of claim 10, wherein the uncertain input parameters represent one or more of uncertain market conditions, uncertain operation conditions, and other uncertain industrial conditions.

14. The system of claim 10, wherein the solution analyzer is further configured to:
    select robust feedstocks from the optimal feedstocks of the different modeled outcomes by:
        generating a probabilistic feed slate distribution from the optimal feedstocks of the different modeled outcomes; and
        applying a threshold probability to the probabilistic feed slate distribution to select one or more robust feedstocks from the distributed feedstocks; and
    establish an optimal feedstock volume for each selected robust feedstock by:
        generating a probabilistic distribution of feedstock volumes provided from the different modeled outcomes for the given robust feedstocks, and
        applying joint chance constraints derived from the probabilistic distribution of the feedstock volumes to establish optimal feedstock procurement volumes for the given robust feedstocks.

15. The system of claim 14, wherein the solution analyzer is further configured to:
    generate a robust base case of the non-linear model, the robust base case being generated to include the joint chance constraints and a capacity-fulfillment constraint; and
    solve the generated robust base case, the solving determining the optimal procurement volumes corresponding to the set of robust feedstocks to procure on long-term contracts.

16. The system of claim 10, wherein the one or more processors are further configured to validate the determined robust feedstocks to procure on long-term contracts by: comparing expected profits from the determined set of robust feedstocks from the first stage against expected profits from a deterministic approach.

17. The system of claim 10, wherein the solver engine is further configured to:
    for each simulation case of the second set of simulation cases:
        solve the given simulation case with the determined set of robust feedstocks from the first stage, the solving determining an optimal value of an objective function for the given simulation case; and
        for each spot feedstock of a set of available spot feedstocks:
            generate a feedstock case by forcing a fixed procurement volume of the given spot feedstock into the given simulation case,
            solve the feedstock case to determine an optimal value of an objective function for the given feedstock case, and
            calculate a breakeven price for the given spot feedstock based on: (i) the determined optimal objective function value for the given simulation case, and (ii) the determined optimal objective function value for the given feedstock case.

18. The system of claim 17, wherein the solution analyzer is further configured to:
    generate ECDFs for breakeven analysis, each ECDF representing, for each spot feedstock, a correspondence between a calculated breakeven price and a risk level; and
    rank each spot feedstock of the set of available spot feedstocks for breakeven analysis, the ranking determined by defining an incremental profit value between a market value and each calculated breakeven price for the given spot feedstock; and
    based on the ECDFs and the ranking, determine the set of robust feedstocks to procure in the spot market.

19. The method of claim 1, wherein programming of operations includes programming any of a plant system application, a blending control system, a process control system, and other control systems.

* * * * *